(12) United States Patent
Miyake

(10) Patent No.: US 11,069,977 B2
(45) Date of Patent: Jul. 20, 2021

(54) LIQUID CRYSTAL ALIGNMENT AGENT, LIQUID CRYSTAL PANEL, AND SCANNING ANTENNA

(71) Applicant: SHARP KABUSHIKI KAISHA, Sakai (JP)

(72) Inventor: Isamu Miyake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 262 days.

(21) Appl. No.: 16/317,795

(22) PCT Filed: Jul. 12, 2017

(86) PCT No.: PCT/JP2017/025379
§ 371 (c)(1),
(2) Date: Jan. 14, 2019

(87) PCT Pub. No.: WO2018/012525
PCT Pub. Date: Jan. 18, 2018

(65) Prior Publication Data
US 2019/0235291 A1    Aug. 1, 2019

(30) Foreign Application Priority Data

Jul. 15, 2016   (JP) .............................. JP2016-140628

(51) Int. Cl.
| | | |
|---|---|---|
| *H01Q 3/00* | (2006.01) |
| *H01Q 3/44* | (2006.01) |
| *H01Q 3/34* | (2006.01) |
| *H01Q 13/22* | (2006.01) |
| *H01Q 13/10* | (2006.01) |
| *G02F 1/1337* | (2006.01) |
| *H01Q 21/06* | (2006.01) |
| *H01Q 15/14* | (2006.01) |

(52) U.S. Cl.
CPC ............. *H01Q 3/44* (2013.01); *G02F 1/1337* (2013.01); *H01Q 3/34* (2013.01); *H01Q 13/10* (2013.01); *H01Q 13/22* (2013.01); *H01Q 15/14* (2013.01); *H01Q 21/06* (2013.01); *H01Q 21/064* (2013.01); *H01Q 21/065* (2013.01)

(58) Field of Classification Search
CPC ........ H01Q 3/005; H01Q 13/22; H01Q 21/06; H01Q 3/34; H01Q 21/065; H01Q 21/064; H01Q 15/14; H01Q 15/0086
USPC ................................. 343/757, 772, 785, 767
See application file for complete search history.

(56) References Cited

U.S. PATENT DOCUMENTS

| | | |
|---|---|---|
| 2007/0273599 A1 | 11/2007 | Haziza |
| 2008/0036664 A1 | 2/2008 | Haziza |
| | (Continued) | |

FOREIGN PATENT DOCUMENTS

| | | |
|---|---|---|
| CN | 101930134 A | 12/2010 |
| CN | 103525436 A | 1/2014 |
| | (Continued) | |

*Primary Examiner* — Joseph J Lauture
(74) *Attorney, Agent, or Firm* — ScienBiziP, P.C.

(57) ABSTRACT

A liquid crystal alignment agent according to the present invention includes: an alignment film forming material; and an organic solvent. The organic solvent contains a compound which has at least two functional groups selected from the group consisting of a methylene group, a methyl group, an ether group, a ketone group, and a hydroxyl group, and does not contain a nitrogen atom.

9 Claims, 8 Drawing Sheets

(56) References Cited

U.S. PATENT DOCUMENTS

| | | |
|---|---|---|
| 2008/0048922 A1 | 2/2008 | Haziza |
| 2008/0111755 A1 | 5/2008 | Haziza |
| 2008/0117113 A1 | 5/2008 | Haziza |
| 2008/0117114 A1 | 5/2008 | Haziza |
| 2008/0316142 A1 | 12/2008 | Haziza |
| 2009/0058747 A1 | 3/2009 | Haziza |
| 2009/0091500 A1 | 4/2009 | Haziza |
| 2011/0007254 A1* | 1/2011 | Terashita ............ C08G 73/1042 349/123 |
| 2012/0092577 A1 | 4/2012 | Shi et al. |
| 2012/0194399 A1 | 8/2012 | Bily et al. |
| 2014/0266946 A1 | 9/2014 | Bily et al. |
| 2015/0229028 A1 | 8/2015 | Bily et al. |
| 2016/0359234 A1 | 12/2016 | Bily et al. |
| 2016/0372834 A1 | 12/2016 | Bily et al. |
| 2019/0221933 A1* | 7/2019 | Asagi ....................... H01Q 1/44 |

FOREIGN PATENT DOCUMENTS

| | | |
|---|---|---|
| JP | 2008-257078 A | 10/2008 |
| JP | 2009-538565 A | 11/2009 |
| JP | 2011-180577 A | 9/2011 |
| JP | 5062443 B2 | 10/2012 |
| JP | 2013-539949 A | 10/2013 |
| JP | 5698328 B2 | 4/2015 |
| JP | 2016-512408 A | 4/2016 |

\* cited by examiner

LIQUID CRYSTAL ALIGNMENT AGENT, LIQUID CRYSTAL PANEL, AND SCANNING ANTENNA

TECHNICAL FIELD

The present invention relates to a liquid crystal alignment agent, a liquid crystal panel, and a scanning antenna.

BACKGROUND ART

A liquid crystal display device includes a liquid crystal display panel in which a liquid crystal layer is interposed between a pair of substrates. In the liquid display panel, a voltage is appropriately applied to an electrode provided on a surface of the substrate facing a liquid crystal layer, thereby controlling an alignment direction of a liquid crystal compound (liquid crystal molecule) constituting the liquid crystal layer in order to perform liquid crystal display. An alignment film for controlling the alignment direction of the liquid crystal compound is generally provided on the surface of the substrate facing the liquid crystal layer.

As the alignment film, for example, a polymer film formed of a polyamic acid, polyimide, polyamide, polyester, or the like has been used. Particularly, polyimide has excellent properties such as a high heat resistance, a high affinity for a liquid crystal, a high mechanical strength, and the like, and thus has been used for a large number of liquid crystal display devices.

In recent years, besides the liquid crystal display device, a device having a component in which a liquid crystal layer is interposed between a pair of substrates has been known. Examples of the device can include a scanning antenna (for example, see Patent Documents 1 to 3). The scanning antenna is an antenna using high dielectric anisotropy (birefringence) of the liquid crystal (including a nematic liquid crystal and a polymer dispersed liquid crystal), and has a beam scanning function that can change a direction of a beam when transmitting or receiving microwaves or the like. The scanning antenna has a component in which a liquid crystal layer is interposed between a pair of substrates including an electrode (that is, the liquid crystal panel).

In addition, examples of another device can include a liquid crystal lens (for example, see Patent Document 4). The liquid crystal lens, which is an optical element, uses a liquid crystal and controls a focal length by an applied voltage. The liquid crystal antenna also includes a component in which a liquid crystal layer is interposed between a pair of substrates including an electrode (that is, the liquid crystal panel).

It should be noted that an alignment film is formed on the outermost surface of the substrate facing the liquid crystal layer also in the scanning antenna, the liquid crystal lens, or the like, similarly to the liquid crystal display device.

RELATED ART DOCUMENT

Patent Document

Patent Document 1: Japanese Translation of PCT International Application Publication NO. JP-T-2013-539949

Patent Document 2: Japanese Translation of PCT International Application Publication NO. JP-T-2016-512408

Patent Document 3: Japanese Translation of PCT International Application Publication NO. JP-T-2009-538565

Patent Document 4: Japanese Patent Publication NO. 5698328

Problem to be Solved by the Invention

A liquid crystal compound having higher polarity (high dielectric anisotropy) is need in the scanning antenna, the liquid crystal lens, or the like, in comparison to that in the liquid crystal display device. When an alignment film for the liquid crystal display device is used as an alignment film of the scanning antenna or the like as described above, an ionic component is generated in a liquid crystal layer and thus a voltage holding ratio (VHR) between substrates of a liquid crystal panel is decreased. When the VHR is decreased, malfunction of the scanning antenna, or the like occurs, which is problematic.

Disclosure of the Present Invention

An object of the present invention is to provide a liquid crystal alignment agent for forming an alignment film which is appropriate for alignment control of a liquid crystal compound having high polarity and suppresses a decrease in a voltage holding ratio (VHR) of a liquid crystal panel, or the like.

Means for Solving the Problem

The present inventors found out that in a liquid crystal panel including a liquid crystal layer including a liquid crystal compound having high polarity, an organic solvent (for example, N-methyl-2-pyrrolidone or 1-ethyl-2-pyrrolidone) containing a nitrogen atom among organic solvents remaining in an alignment film flows out to the liquid crystal layer, such that a voltage holding ratio is decreased. The present invention is based on the fact described above. The decrease in the voltage holding ratio as described above was not problematic in a liquid crystal display device according to the related art in which a liquid crystal compound having low polarity is used.

A liquid crystal alignment agent according to the present invention includes: an alignment film forming material; and an organic solvent. The organic solvent contains a compound which has at least two functional groups selected from the group consisting of a methylene group, a methyl group, an ether group, a ketone group, and a hydroxyl group, and does not contain a nitrogen atom.

In the liquid crystal alignment agent, the organic solvent may contain at least one selected from the group consisting of γ-butyrolactone, diethylene glycol diethyl ether, diethylene glycol ethyl methyl ether, diisobutyl ketone, butyl cellosolve, 1-butoxy-2-propanol, and cyclopentanone.

In the liquid crystal alignment agent, the organic solvent may contain γ-butyrolactone and/or cyclopentanone as a main agent.

In the liquid crystal alignment agent, the organic solvent may contain at least one selected from the group consisting of 1-butoxy-2-propanol, butyl cellosolve, diethylene glycol diethyl ether, diethylene glycol ethyl methyl ether, and diisobutyl ketone, in addition to γ-butyrolactone.

In the liquid crystal alignment agent, the organic solvent may contain diisobutyl ketone, in addition to γ-butyrolactone.

In the liquid crystal alignment agent, the alignment film forming material may be a material forming an alignment film which aligns a liquid crystal compound having dielectric anisotropy (Δε) of 10 or more.

In the liquids crystal alignment agent, the alignment film forming material may contain an acrylic polymer.

In the liquid crystal alignment agent, the alignment film forming material contains a polyamic acid.

Further, a liquid crystal panel according to the present invention includes: a liquid crystal layer; and a pair of first and second substrates disposed with the liquid crystal layer interposed therebetween and including an alignment film formed on a surface of each of the first and second substrates facing the liquid crystal layer, or a surface of any one of the first and second substrates facing the liquid crystal layer, by using any one of the liquid crystal alignment agents described above.

In the liquid crystal panel, dielectric anisotropy (Δε) of a liquid crystal compound constituting the liquid crystal layer may be 10 or more.

Further, a scanning antenna according to the present invention includes any one of the liquid crystal panels described above and antenna units are arranged therein. The first substrate of the liquid crystal panel incudes: a thin film transistor (TFT) substrate including a first dielectric substrate, TFTs supported by the first dielectric substrate, patch electrodes electrically connected to the TFTs; and a first alignment film disposed to cover the TFTs and the patch electrodes and including the alignment film. The second substrate or the liquid crystal panel includes a slot substrate including a second dielectric substrate, a slot electrode supported by the second dielectric substrate and including slots, and a second alignment film disposed to cover the slot electrode and including the alignment film. The liquid crystal layer of the liquid crystal panel is interposed between the TFT substrate and the slot substrate of which the first alignment film and the second alignment film face each other. The scanning antenna further includes a reflective conductive plate disposed to face an opposite surface of the second dielectric substrate on which the slot electrode is not formed with a dielectric layer interposed therebetween.

Advantageous Effect of the Invention

According to the present invention, it is possible to provide the liquid crystal alignment agent for forming the alignment film which is appropriate for alignment control of the liquid crystal compound having high polarity and suppresses a decrease in a voltage holding ratio (VHR) of the liquid crystal panel, or the like.

MODE FOR CARRYING OUT THE INVENTION

[Liquid Crystal Alignment Agent]

A liquid crystal alignment agent is a liquid composition or a sol composition having fluidity for forming an alignment film (liquid crystal alignment film) of a Liquid crystal panel included in a liquid crystal device.

Figure 1:
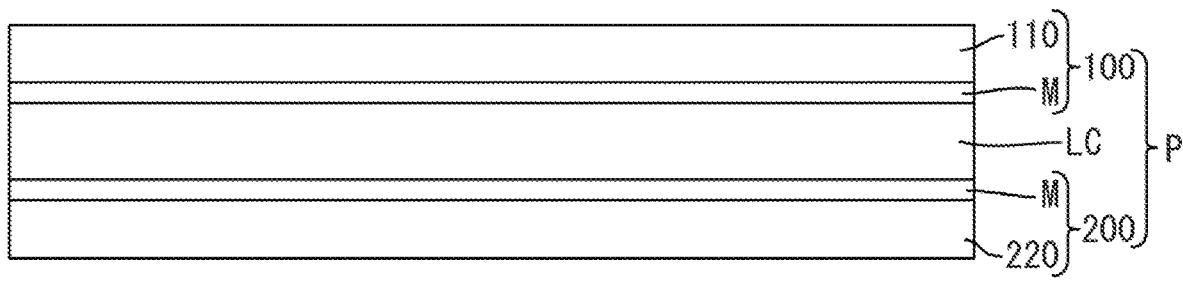
FIG. 1 is a cross-sectional view schematically showing a configuration of a liquid crystal panel included in a liquid crystal device.

Here, the liquid crystal panel included in the liquid crystal device will be first described with reference to FIG. 1. FIG. 1 is a cross-sectional view schematically showing a configuration of a liquid crystal panel P included in a liquid crystal device. The liquid crystal panel P includes a liquid crystal layer LC and a pair of first and second substrates 100 and 200 disposed with the liquid crystal layer LC interposed therebetween and including as alignment film M formed on a surface of each of the first and second substrates 100 and 200 facing the liquid crystal layer LC, or a surface of any one of the first and second substrates 100 and 200 facing the liquid crystal layer LC, by using the liquid crystal alignment agent. In FIG. 1, alignment films M and M are formed on a surface of the first substrate 100 and a surface of the second substrate 200, respectively.

The first substrate 100 includes a first support substrate 110 supporting a first electrode (not shown), and the alignment film M is formed so as to cover the first electrode and the like. Further, the second substrate 200 includes a second support substrate 220 supporting a second electrode (not shown), and the alignment film M is formed so as to cover the second electrode and the like. In other cases, the first and second electrodes may also be formed on any one of the first substrate 100 or the second substrate 200.

The liquid crystal layer LC used for the liquid crystal panel P may be formed of, for example, a liquid crystal compound (a liquid crystal compound having high dielectric anisotropy) having high polarity. A specific liquid crystal compound used for the liquid crystal panel P will be described later.

The alignment film M included in the first substrate 100 and the like of the liquid crystal panel P is in contact with, for example, the liquid crystal layer LC including the liquid crystal compound having high polarity at all times. Differently from an alignment film according to the related art, even when the alignment film M is in contact with the liquid crystal compound having high polarity as described above, an ionic component or the like is not generated in the liquid crystal layer LC, and thus a decrease in a voltage holding ratio (VHR) of the liquid crystal panel P is suppressed. Hereinafter, the liquid crystal alignment agent for forming the alignment film M will be described in detail.

The liquid crystal alignment agent is formed of a composition containing an alignment film forming material and a predetermined organic solvent and having fluidity (a predetermined viscosity).

The alignment film forming material can form an alignment film (liquid crystal alignment film) which can align the liquid crystal compound in a predetermined direction, and is not particularly limited as long as it is a material having solubility in the predetermined organic solvent to be described later, unless the object of the present invention is impaired. Examples of the alignment film forming material can include an acrylic polymer for forming an alignment film formed of an acrylic resin.

Examples of the acrylic polymer can include a polymer of a monomer composition containing alkyl (meth)acrylate having an alkyl group (hereinafter, simply referred to as "alkyl (meth)acrylate") and/or (meth)acrylate having a photoreactive functional group (photofunctional group) (hereinafter, simply referred to as "photoreactive (meth)acrylate"). In the present description of the present application, the term "(meth)acryl" means "acryl" and/or "methacryl" (any one or both of "acryl" and "methacryl"). Further, in the present description, the term "photofunctional group" is a functional group exhibiting a characteristic of controlling alignment of the liquid crystal compound by light irradiation.

As the alkyl (meth)acrylate, for example, a compound represented by the following Chemical Formula (1) can be appropriately used.

[Chemical Formula 1]

$$CH_2=C(R^1)COOR2 \qquad (1)$$

In Chemical Formula (1) above, $R^1$ is a hydrogen atom or a methyl group. In addition, $R^2$ is a linear or branched-chain alkyl group having 1 to 18 carbon atoms. It should be noted that $R^2$ is preferably a linear or branched-chain alkyl group having 1 to 10 carbon atoms, and more preferably, a linear or branched-chain alkyl group having 1 to 8 carbon atoms.

Specific examples of the alkyl (meth)acrylate can include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate (lauryl (meth)acrylate), tridecyl (meth)acrylate, tetradecyl (meth)acrylate, pantadecyl (meth)acrylate, hexadecyl (meth)acrylate, heptadecyl (meth)acrylate, octadecyl (meth)acrylate (stearyl (meth)acrylate), isostearyl (meth)acrylate, and the like. These may be used alone or in combination of two or more thereof.

Further, for example, a compound represented by the following Chemical Formula (2) can be appropriately used as the photoreactive (meth)acrylate.

[Chemical Formula 2]

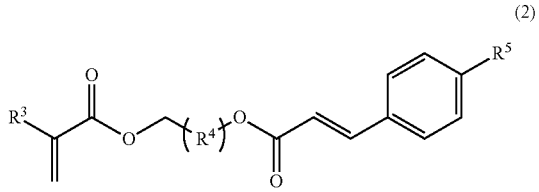

(2)

$R^3$ in Chemical Formula (2) above is a hydrogen atom or a methyl group. Further, $R^4$ is a spacer portion, and is a single bond or a divalent organic group. It should be noted that $R^4$ is not indispensable, and may be omitted. $R^5$ is a modifying group, and is a monovalent organic group or a hydrogen atom. The photoreactive (meth)acrylate reacts to a predetermined light such as ultraviolet rays when it receives the predetermined light, such that a structure of the photoreactive (meth)acrylate is changed.

When the acrylic polymer includes a constitutional unit derived from the photoreactive (meth)acrylate represented by Chemical Formula (2) above, the alignment film formed of the acrylic polymer can be used as a photo alignment film (acrylic photo alignment film). When a predetermined light (for example, linearly polarized ultraviolet rays) is irradiated (photo alignment processing) from a specific direction, the photo alignment film (acrylic alignment film) exerts a function of aligning the liquid crystal compound in the liquid crystal layer in the specific direction. As described above, a photoreactive acrylic polymer including a constitutional unit derived from an acrylic monomer having a photoreactive functional group at a side chain thereof may be included as the alignment film forming material.

The acrylic polymer may also include a constitutional unit derived from another monomer, besides the constitutional unit derived from the monomer (the alkyl (meth)acrylate and the photoreactive (meth)acrylate).

Examples of another monomer can include (meth)acrylate containing a non-photoreactive vertical side chain for the purpose of controlling a tilt angle of the liquid crystal compound, or the like, or (meth)acrylate containing a non-photoreactive thermally crosslinkable side chain for the purpose of improving reliability, or the like.

The acrylic polymer is prepared by polymerizing the monomer composition by a known or conventional polymerization method. Examples of the polymerization method of the acrylic polymer can include a solution polymerization method, an emulsion polymerization method, a bulk polymerization method, a polymerization method by ultraviolet irradiation, and the like. If should be noted that appropriate components corresponding to the respective polymerization methods such as a polymerization initiator, a chain transfer agent, an emulsifier, a solvent, and the like are appropriately selected from known or conventional components and used at the time of polymerization of the acrylic polymer. A weight average molecular weight of the acrylic polymer is not particularly limited, unless the object of the present invention is impaired. Examples of the appropriate acrylic polymer used as the alignment film forming material can include polymethyl methacrylate (PMMA).

In addition, examples of another alignment film forming material can include a polyamic acid for forming an alignment film formed of a polyimide resin.

Examples of the polyamic acid can include, are not particularly limited to, a compound represented by the following Chemical Formula (3).

[Chemical Formula 3]

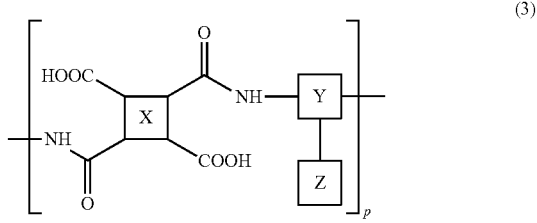

(3)

In Chemical Formula (3), p is any natural number. In addition, in Chemical Formula (3), when X has the photofunctional group, X has structures represented by the following Chemical Formulae (4-1) to (4-4), when Y has the photofunctional group, Y has structures represented by the following Chemical Formulae (5-1) to (5-8), and when Z has the photofunctional group, Z has structures represented by the following Chemical Formulae (6-1) to 6-5). It should be noted that Z is not present in a case of a main-chain type polyamic acid.

[Chemical Formula 4]

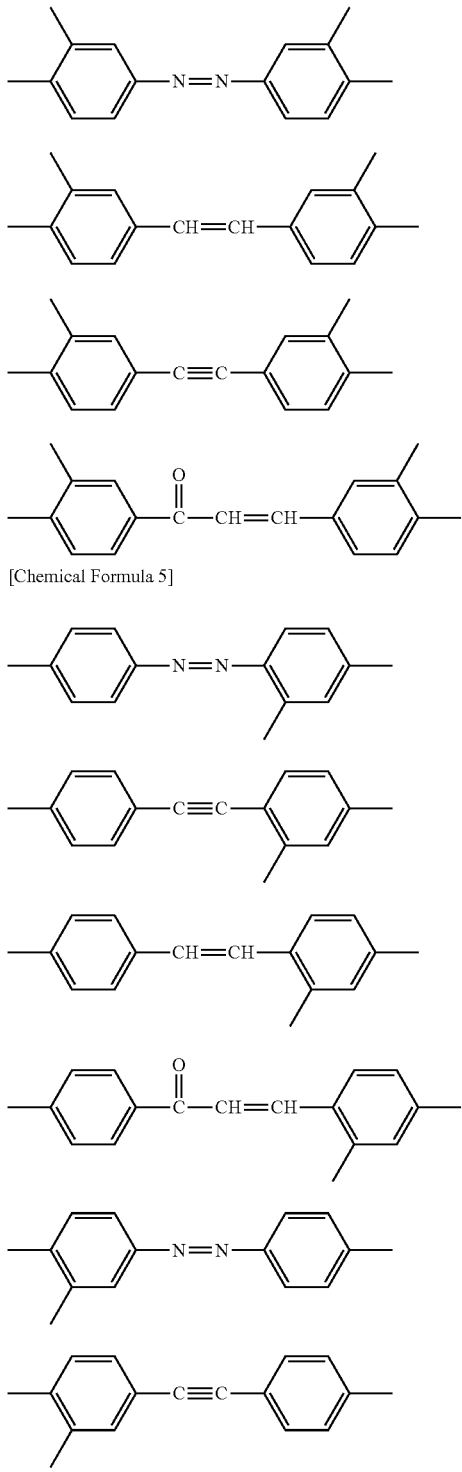

[Chemical Formula 5]

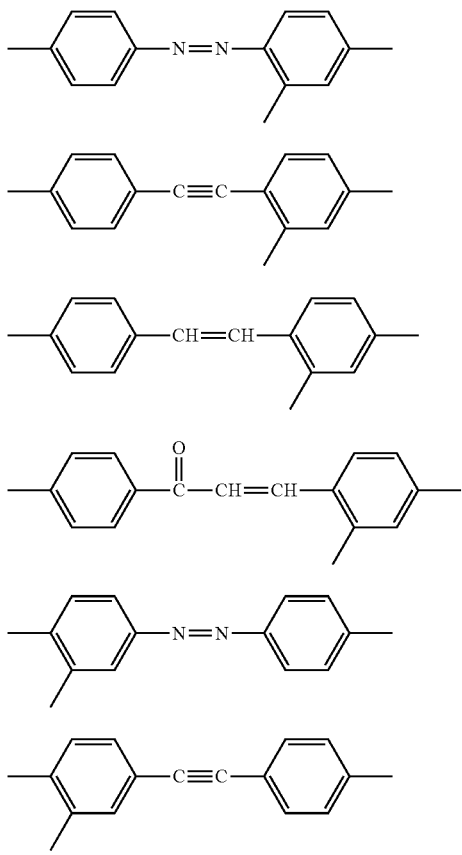

[Chemical Formula 6]

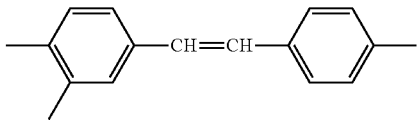

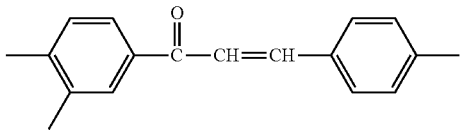

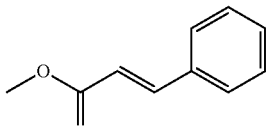

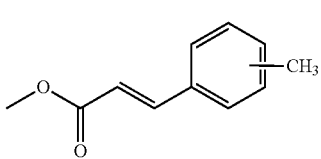

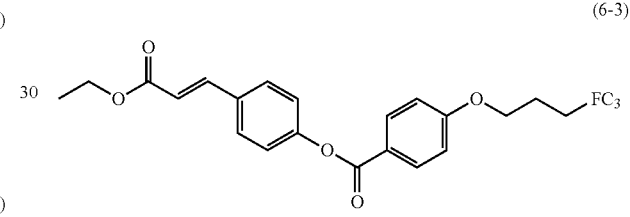

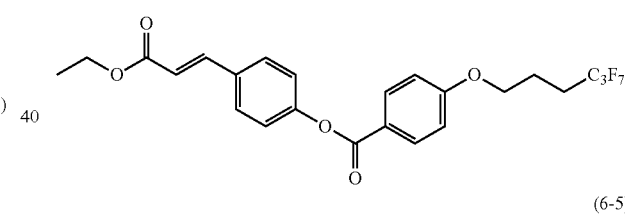

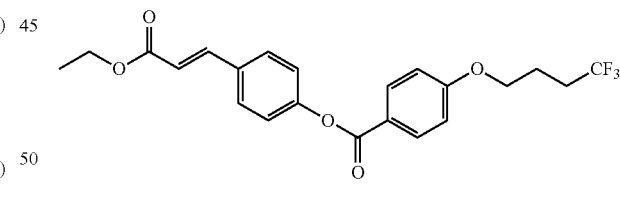

In Formula (3), when X has the photofunctional group, X has a structure including any one of an azobenzene group, a tolan group, a stilbene group, and a chalcone group as described above. Further, in Chemical Formula (3), when Y has the photofunctional group, Y has a structure including any one of an azobenzene group, a tolan group, a stilbene group, and a chalcone group as described above. Further, in Chemical Formula (3), when Z (side chain) has the photofunctional group, Z has a structure including a cinnamate group as described above.

A specific structure of the polymer represented by Chemical Formula (3) above is appropriately selected depending on a direction (for example, a horizontal direction or a vertical direction) in which the liquid crystal compound is aligned.

In Chemical Formula (3), when X has a structure other than the photofunctional group, the structure of X is not particularly limited, and can be, for example, structures represented by the following Chemical Formulae (7-1) to (7-7).

[Chemical Formula 7]

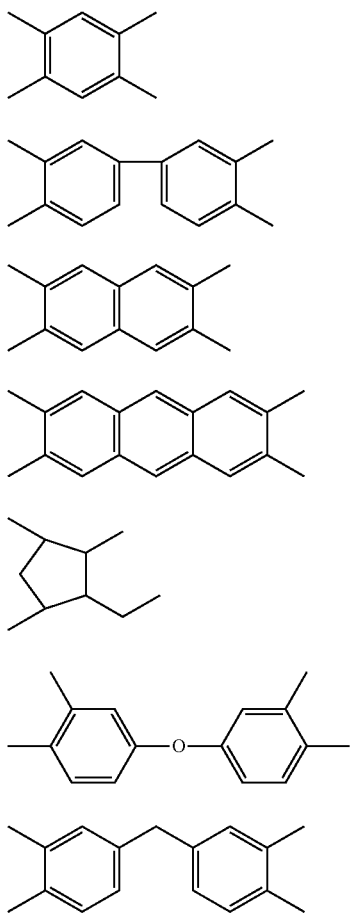

(7-1)
(7-2)
(7-3)
(7-4)
(7-5)
(7-6)
(7-7)

Further, in Chemical Formula (3), when Y has a structure other than the photofunctional group, the structure of Y is not particularly limited, and can be, for example, structures represented by the following Chemical Formulae (8-1) to (8-9).

[Chemical Formula 8]

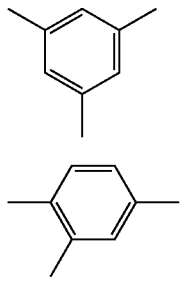

(8-1)

(8-2)

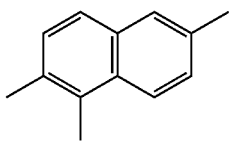

(8-3)

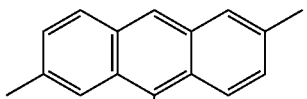

(8-4)

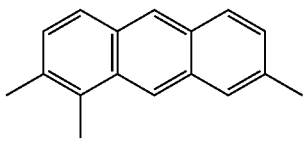

(8-5)

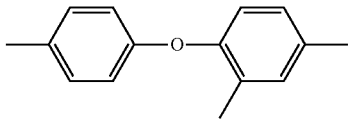

(8-6)

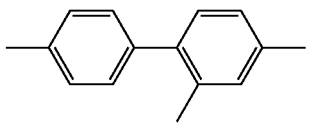

(8-7)

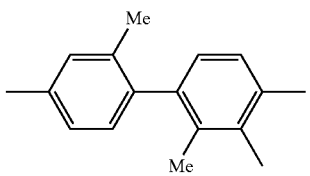

(8-8)

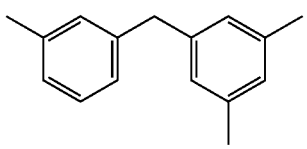

(8-9)

Further, in Chemical Formula (3), when Z has a structure other than the photofunctional group, the structure of Z is not particularly limited unless the object of the present invention is impaired.

The polyamic acid used as the alignment film forming material may not have a photofunctional group. In addition, other polymers other than the acrylic polymer and the polyamic acid may also be used as the alignment film forming material.

When the liquid crystal alignment agent is used for forming the alignment film performing alignment control of the liquid crystal compound having high polarity, an acrylic polymer having a low hygroscopicity and excellent solubility in the predetermined organic solvent to be described later is preferably used as the alignment film forming material. In addition, a polymer having the photofunctional group (for example, a photoreactive acrylic polymer) is preferably used as the alignment film forming material for a reason that it is easy to perform alignment processing of the alignment film, or the like.

The predetermined organic solvent (hereinafter, referred to as an alignment agent organic solvent) used for the liquid crystal alignment agent is a solvent which dissolves the alignment film forming material. The alignment agent organic solvent is formed of a compound which has at least two functional groups selected from the group consisting of a methylene group (—CH$_2$—), a methyl group (CH$_3$—), an ether group (—O—), a ketone group, and a hydroxyl group, and does not contain a nitrogen atom. The alignment agent organic solvent has a capacity for dissolving the alignment film forming material, and does not contain a nitrogen atom. Therefore, after the alignment film is formed, an ionic composing or the like is not generated in the liquid crystal layer LC, and thus a decrease in a voltage holding ratio (VHR) of the liquid crystal panel P can be suppressed.

In addition, more preferably, the alignment agent organic solvent is formed of a compound which has at least two functional groups selected from the group consisting of a methylene group (—CH$_2$—), a methyl group (CH$_3$—), an ether group (—O—), and a ketone group, and does not contain a nitrogen atom. The alignment agent organic solvent has a capacity for dissolving the alignment film forming material, and does not contain a nitrogen atom. Therefore, after the alignment film is formed, an ionic component or the like is not generated in the liquid crystal layer LC, and thus a decrease in a voltage holding ratio (VHR) of the liquid crystal panel P can be suppressed.

Specific examples of the alignment agent organic solvent can include compounds represented by the following Chemical Formulae (9-1) to (9-7).

[Chemical Formula 9]

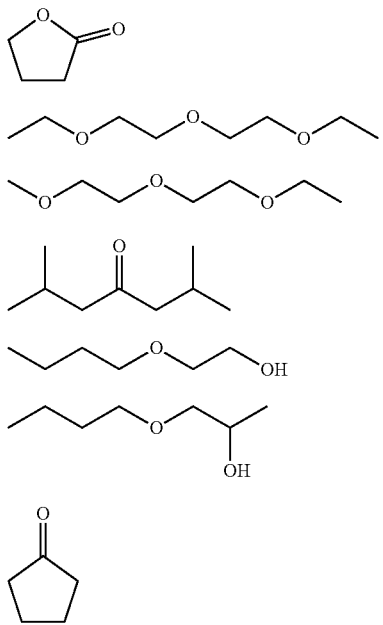

(9-1)

(9-2)

(9-3)

(9-4)

(9-5)

(9-6)

(9-7)

A compound represented by Chemical Formula (9-1) is γ-butyrolactone (GBL), a compound represented by Chemical Formula (9-2) is diethylene glycol diethyl ether (DEDE), a compound represented by Chemical Formula (9-3) is diethylene glycol ethyl methyl ether (EDM), a compound represented by Chemical Formula (9-4) is diisobutyl ketone (DIBK), a compound represented by Chemical Formula (9-5) is butyl cellosolve (BC), a compound represented by Chemical Formula (9-6) is 1-butoxy-2-propanol (BP), and a compound represented by Chemical Formula (9-7) is cyclopentanone (CP).

The alignment agent organic solvent may be prepared from one of the compounds or a combination of two or more of the compound unless the alignment film forming material is precipitated or the like.

In the liquid crystal alignment agent, a mixing ratio of the alignment film forming material and the alignment agent organic solvent is not particularly limited, unless the object of the present invention of the present application is impaired. A mixing amount of the alignment film forming material is generally set to a range in which the liquid crystal alignment agent has a certain viscosity and the alignment film forming material is completely dissolved in the alignment agent organic agent for a reason that it is easy to form the alignment film, or the like.

It is preferable that the alignment agent organic solvent contain at least one selected from the group consisting of γ-butyrolactone, diethylene glycol diethyl ether, diethylene glycol ethyl methyl ether, diisobutyl ketone, butyl cellosolve, 1-butoxy-2-propanol, and cyclopentanone. The alignment agent organic solvent has a capacity for dissolving the alignment film forming material, and does not contain a nitrogen atom. Therefore, after the alignment film is formed, an ionic component or the like is not generated in the liquid crystal layer LC, and thus a decrease in a voltage holding ratio (VHR) of the liquid crystal panel P can be suppressed.

In addition, it is preferable that the alignment agent organic solvent contain γ-butyrolactone and/or cyclopentanone as a main agent. In the alignment agent organic solvent, the main agent refers to a part of the alignment agent organic solvent accounting for 40% by mass or more of the whole alignment agent organic solvent is the liquid crystal alignment agent. The case where γ-butyrolactone and/or cyclopentanone is contained as the main agent is any one of "a case where only γ-butyrolactone is contained and accounts for 40% by mass or more", "a case where only cyclopentanone is contained and accounts for 40% by mass or more", and "a case where a mixed solvent of γ-butyrolactone and cyclopentanone is contained and accounts for 40% by mass or more". γ-Butyrolactone and/or cyclopentanone has a high capacity for dissolving the alignment film forming material, and thus is preferably used as the main agent. The alignment agent organic solvent containing γ-butyrolactone and/or cyclopentanone as the main agent is excellent in a property of uniformly maintaining a thickness of a coated film (hereinafter, referred to as coated film uniformity).

In addition, it in preferable that the alignment agent organic solvent contain γ-butyrolactone as the main agent. γ-Butyrolactone has a particularly high capacity for dissolving the alignment film forming material, and is a good solvent. In the present description, the term "good solvent" refers to an alignment agent organic solvent which dissolves substantially the whole of the alignment film forming material (solid component) (preferably, completely) under a condition of a room temperature (24° C.) when a concentration of the alignment film forming material (solid component) is 2 to 10% by mass.

In addition, the alignment agent organic solvent may contain at least one selected from the group consisting of 1-butoxy-2-propanol (BP), butyl cellosolve (BC), diethylene glycol diethyl ether (DEDE), diethylene glycol ethyl methyl ether (DEDM), and diisobutyl ketone (DIBK), in addition to γ-butyrolactone (GBL). γ-Butyrolactone is a good solvent and has a particularly high capacity for dissolving the alignment film forming material as described above. On the contrary, all of 1-butoxy-2-propanol (BP), butyl cellosolve (BC), diethylene glycol diethyl ether (DEDE), diethylene glycol ethyl methyl ether (DEDM), and diisobutyl ketone (DIBK) are not good solvents (hereinafter, referred to as poor solvents), but are excellent in a property of making the liquid crystal alignment agent spread easily (spreadability), the coated film uniformity, and the like. For this reason, the poor solvents (BP, BC, DEDE, DEDM, and DIBK) may be used as the alignment agent organic solvent of the liquid crystal alignment agent in an amount which is enough not to make the alignment film forming material be precipitated, together with γ-butyrolactone being a good solvent, in order to secure spreadability, coated film uniformly, and the like.

In addition, the alignment agent organic solvent may contain diisobutyl ketone, in addition to γ-butyrolactone. When the liquid crystal alignment agent is coated on an object (for example, the first substrate 100 or the like) by, for example, an inkjet method, the liquid crystal alignment agent is required to have low volatility, low surface tension, on the object (the first substrate 100 or the like), and the like, in addition to spreadability, coated film uniformity, and the like. Diisobutyl ketone (DIBK) has the properties as described above (spreadability, coated film uniformity, low volatility, wettability (low surface tension), and the like), and thus may be used in an amount which is enough not to make the alignment film forming material be precipitated, together with γ-butyrolactone.

A method of forming the alignment film M by using the liquid crystal alignment agent is not particularly limited, and a known method of forming an alignment film can be applied. For example, the liquid crystal alignment agent is coated on a surface of the first substrate 100 or the like which is a coating object by using a known coating method (for example, a spin coating method, an inkjet method, or the like). The coated film after being coated is appropriately heated for the purpose of removing a solvent, curing a polymer, or the like.

When the coated film formed of the liquid crystal alignment agent is subjected to alignment processing, a function of aligning the liquid crystal compound in a predetermined direction is exerted, and the coated film becomes the alignment film M. The alignment processing is not particularly limited, and rubbing processing may be performed as the alignment processing. When the coated film is formed of a polymer having the photofunctional group, photo alignment processing in which light (for example, linearly polarized ultraviolet rays) is irradiated from a predetermined direction may also be performed.

It should be noted that a thickness of the alignment film M is not particularly limited, and may be appropriately set as necessary.

The alignment film M that can be obtained by using the liquid crystal alignment agent according to the present embodiment can be used not only for alignment control of a general liquid crystal compound which is used in a liquid crystal display device according to the related art, but also for alignment control of a liquid crystal compound having higher polarity than that of the general liquid crystal compound.

Here, the specific liquid crystal compound used for the liquid crystal panel P described above will be described. The liquid crystal compound used for the liquid crystal panel P is appropriately selected from known liquid crystal compounds depending on the use of the liquid crystal panel P.

The liquid crystal panel P according to the present embodiment can use a liquid crystal compound having high polarity which may decrease a voltage holding ratio (VHR) in a liquid crystal device according to the related art. The alignment film M formed of the liquid crystal alignment agent according to the present embodiment can prevent an ionic component or the like from being generated in the liquid crystal layer LC to thereby suppress a decrease in a voltage holding ratio (VHR) of the liquid crystal panel P.

Examples of the liquid crystal compound having high polarity which can be used for the liquid crystal layer LC of the liquid crystal panel P can include a liquid crystal compound having dielectric anisotropy (Δε) of 10 or more.

In addition, examples of the liquid crystal compound having high polarity which can be used for the liquid crystal layer LC of the liquid crystal panel P can include a compound having at least one functional group selected from the group consisting of a halogen group (a F group, a Cl group, and a Br group), an SCN group, an NCS group, a CN group, an OCN group, an NCO group, a $CF_3$ group, an $OCF_3$ group, and an $SF_5$ group at a terminal of the liquid crystal compound.

Further, a liquid crystal compound having at least one bond selected from the group consisting of a carbon-carbon triple bond (acetylene bond), —CH=CH—, —CF=CF—, —CF=CH—, —CH=CF—, —(CO)O—, —O(CO)—, and —O— therein in addition to the functional group, is appropriate as the liquid crystal compound having high polarity.

Specific examples of the liquid crystal compound having high polarity which can be used for the liquid crystal panel P can include liquid crystal compounds represented by the following Chemical Formulae (10-1) to (10-4) each having an NCS group (isothiocyanate group) at a terminal thereof.

[Chemical Formula 10]

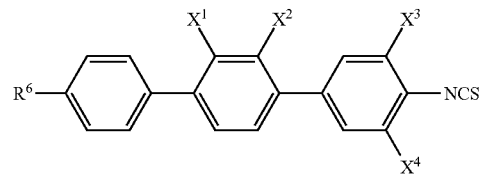

(10-1)

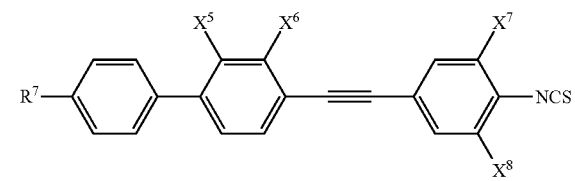

(10-2)

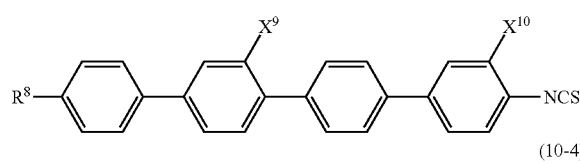

(10-3)

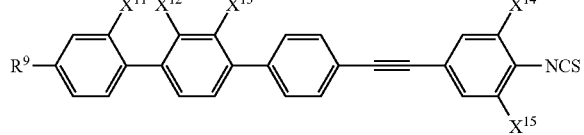

(10-4)

In Chemical Formulae (10-1) to (10-4) above, all of $R^6$, $R^7$, $R^8$, and $R^9$ are each a straight-chain alkyl group (for example, an ethyl group ($C_2H_5$), a propyl group ($C_3H_7$), a butyl group ($C_4H_9$), a pentyl group ($C_5H_{11}$)) having 2 to 5 carbon atoms. Further, in Chemical Formulae (10-1) to (10-4) above, $X^1$, $X^2$, $X^3$, $X^4$, $X^5$, $X^6$, $X^7$, $X^8$, $X^9$, $X^{10}$, $X^{11}$, $X^{12}$, $X^{13}$, $X^{14}$, and $X^{15}$ are independent of each other, and are each any of H (hydrogen atom), F (fluorine atom), $CH_3$ (methyl group), and Cl (chloro group).

For example, if is possible no obtain a liquid crystal composition having dielectric anisotropy (Δε) of 10 or more by appropriately combining the liquid crystal compounds represented by Chemical Formulae (10-1) so (10-4) above. The liquid crystal compound having high polarity as described above is appropriate for, for example, a scanning antenna or a liquid crystal lens to be described later.

Examples of the liquid crystal device including the liquid crystal panel P as described above can include a scanning antenna using a liquid crystal, a liquid crystal lens using a liquid crystal as an optical, element, and the like. Next, the scanning antenna will be described as a specific example of the liquid crystal device to which the liquid crystal alignment agent is applied.

[Basic Structure of Scanning Antenna]

The scanning antenna has a beam scanning function that can change a direction of a beam and has a structure in which it includes antenna units that use high anisotropy (birefringence) of a dielectric constant $m(\varepsilon_m)$ of a liquid crystal material. The scanning antenna controls a voltage applied to a liquid crystal layer of each antenna unit to change an effective dielectric constant $m(\varepsilon_m)$ of the liquid crystal layer of each antenna unit, thereby forming a two-dimensional pattern by the antenna units having different capacitances. Since the dielectric constant of the liquid crystal material has frequency dispersion, a dielectric constant in a frequency band of a microwave is particularly referred to as a "dielectric constant $m(\varepsilon_m)$" in the present description.

Electromagnetic waves (for example, microwaves) emitted from the scanning antenna or received by the scanning antenna are given a phase difference corresponding to a capacitance of each antenna unit to have a strong directivity in a specific direction depending on the two-dimensional pattern formed by the antenna units having the different capacitances (beam scanning). For example, the electromagnetic waves emitted from the scanning antenna can be obtained by integrating spherical waves obtained by allowing input electromagnetic waves to be incident to each antenna unit and scattering the incident input electromagnetic waves by each antenna unit in consideration of the phase difference given by each antenna unit.

Figure 2:
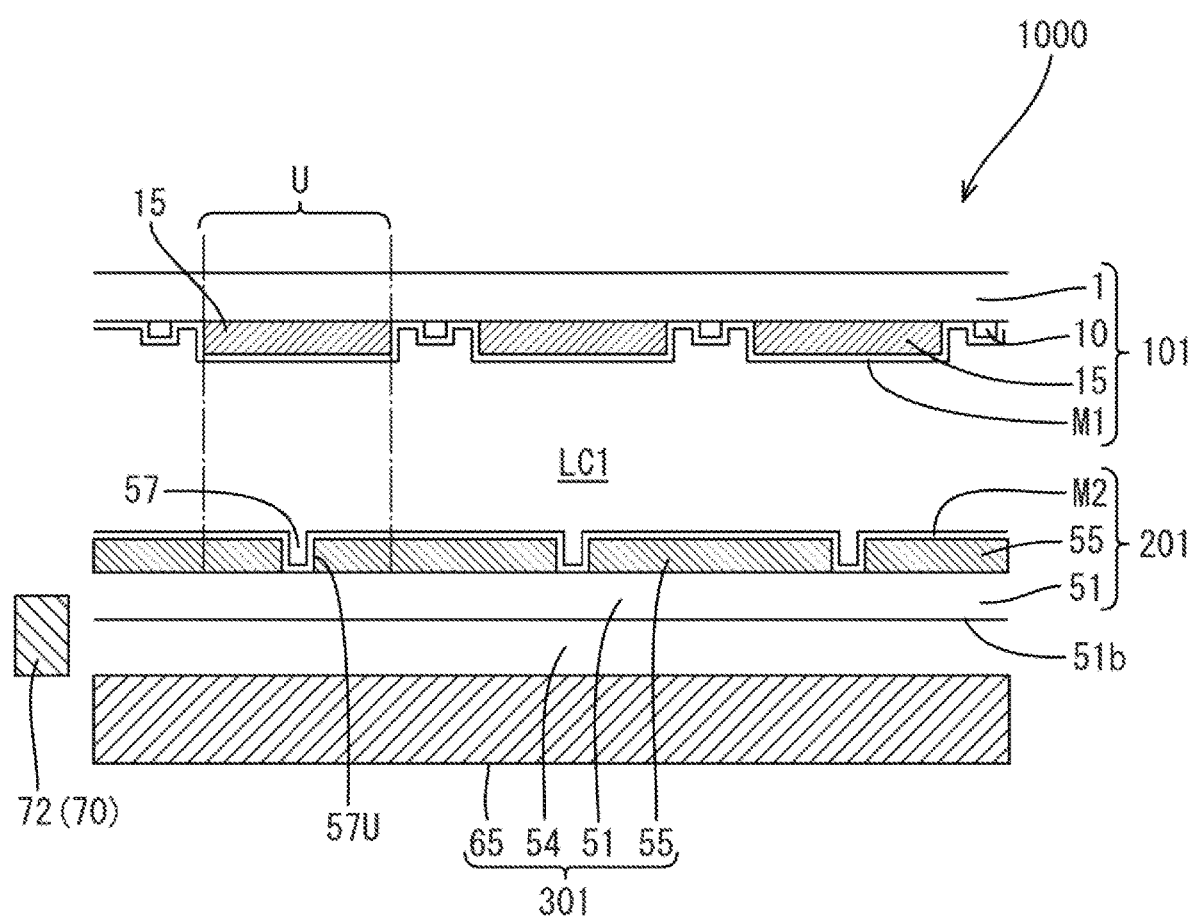
FIG. 2 is a cross-sectional view schematically showing a part of a scanning antenna according to an embodiment.

Here, a basic structure of a scanning antenna according to an embodiment of the present invention will be described with reference to FIG. 2 and the like. FIG. 2 is a cross-sectional view schematically showing a part of a scanning antenna 1000 according to an embodiment. The scanning antenna 1000 according to the present embodiment is a radial inline slot antenna in which slots 57 are arranged in a concentric shape. In FIG. 2, a part of a cross section taken along a radial direction from a feeding pin 72 provided in the vicinity of the center of the slots arranged in the concentric shape is schematically shown. In another embodiment, an array of the slots may be various known arrays (for example, a spiral shape or a matrix shape).

The scanning antenna 1000 mainly includes a thin film transistor (TFT) substrate 101 (an example of the first substrate 100), a slot substrate 201 (as example of the second substrate 200), a liquid crystal layer LC1 (an example of the liquid crystal layer LC) disposed between the TFT substrate 101 and the slot substrate 201, and a reflective conductive plate 65. The scanning antenna 1000 is configured to transmit and receive microwaves to and from the TFT substrate 101. The TFT substrate 101 and the slot substrate 201 are disposed so as to face each other with the liquid crystal layer LC1 interposed therebetween.

The TFT substrate 101 includes a dielectric substrate (an example of a first dielectric substrate and the first support substrate) 1 such as a glass substrate, patch electrodes 15 and thin film transistors (TFTs) 10 formed on a surface of the dielectric substrate 1 facing the liquid crystal layer LC1, and an alignment film M1 (an example of the alignment film M and the first alignment film) formed on the outermost surface facing the liquid crystal layer LC1. A gate bus line and a source bus line (not shown is FIG. 2) are connected to each TFT 10.

The slot substrate 201 includes a dielectric substrate (an example of a second dielectric substrate and the second support substrate) 51 such as a glass substrate, a slot electrode 55 formed on a surface of the dielectric substrate 51 facing the liquid crystal layer LC1, and an alignment film M2 (an example of the alignment film M and the second alignment film) formed on the outermost surface facing the liquid crystal layer LC1. The slot electrode 55 has slots 57.

It is preferable that the dielectric substrates 1 and 51 each used in the TFT substrate 101 and the slot substrate 201 have a small dielectric loss against microwaves, and in addition to the glass substrate, a plastic substrate can be used as the dielectric substrates 1 and 51. A thickness of each of the dielectric substrates 1 and 51 is not particularly limited, and is, for example, preferably, 400 μm or less, and more preferably, 300 μm or less. A lower limit of the thickness of each of the dielectric substrates 1 and 51 is not particularly limited, and may be any value as long as each of the dielectric substrates 1 and 51 has a strength that can withstand a producing process and the like.

The reflective conductive plate 65 is disposed so as to face the slot substrate 201 with an air layer 54 interposed therebetween. In another embodiment, layer formed of a dielectric (for example, a fluororesin such as polytetrafluoroethylene (PTFE)) having a small dielectric constant m for microwaves may be used instead of the air layer 54. In the scanning antenna 1000 according to the present embodiment, the slot electrode 55, the reflective conductive plate 65, and the dielectric substrate 51 and the air layer 54 between the slot electrode 55 and the reflective conductive plate 65 function as a waveguide 301.

The patch electrode 15, a portion (hereinafter, referred to as a "slot electrode unit 57U") of the slot electrode 55 including the slot 57, and the liquid crystal layer LC1 between the patch electrode 15 and the slot electrode unit 57U constitute an antenna unit U. In each antenna unit U, one island-shaped patch electrode 15 faces one hole-shaped slot 57 (slot electrode unit 57U) with the liquid crystal layer LC1 interposed therebetween, such that a liquid crystal capacitance is configured. In the scanning antenna 1000 according to the present embodiment, antenna units U are arranged in a concentric shape. It should be noted that the antenna unit U includes an auxiliary capacitance electrically connected in parallel with the liquid crystal capacitance.

The slot electrode 55 constitutes the antenna unit U in each slot electrode unit 570, and also functions as a wall of the waveguide 301. For this reason, the slot electrode 55 needs to have a function of suppressing transmission of the microwaves, and is formed of a relatively thick metal layer. Examples of the metal layer can include a copper (Cu) layer, an aluminum (Al) layer, and the like. For example, in order to reduce a microwave of 10 GHz up to 1/150, a thickness of the Cu layer is set to 3.3 μm or more, and a thickness of the Al layer is set to 4.0 µm or more. In addition, in order to reduce a microwave of 30 GHz up to 1/150, a thickness of the Cu layer is set to 1.9 µm or more, and a thickness of the Al layer is set to 2.3 µm or more. An upper limit of a thickness of the metal layer constituting the slot electrode 55 is not particularly limited, but if can be preferable that the thickness of the metal layer be as small as possible in consideration of the formation of the alignment film M2 as describe below. When the Cu layer is used as the metal layer, there is an advantage that the Cu layer can be made thinner than the Al layer. As a method of forming the slot electrode 55, other methods such as a thin film deposition method used in technology of a liquid crystal display device according to the related art or a method of attaching a metal foil (for example, a Cu foil or an Al foil) onto a substrate may be used. A thickness of the metal layer is set to, for example, 2 µm or more to 30 µm or less. In addition, in a case of forming the metal layer by the thin film deposition method, the thickness of the metal layer is set to, for example, 5 µm or leas. For example, an aluminum plate, a copper plate, or the like having a thickness of several millimeters can be used as the reflective conductive plate 65.

Since the patch electrode 15 does not constitute the waveguide 301 unlike the slot electrode 55, the patch electrode 15 is formed of a metal layer having a thickness smaller than that of the slot electrode 55. It is preferable that a resistance of the patch electrode 15 be low in order to avoid loss that vibrations of free electrons in the patch electrode 15 are changed into heat when vibrations of free electrons in the vicinity of the slot 57 of the slot electrode 55 cause the vibrations of the free electrons in the patch electrode 15. In terms of mass productivity and the like, it is more preferable to use an Al layer than to use a Cu layer, and it is preferable that a thickness of the Al layer be, for example, 0.5 µm or more to 2 µm or less.

An array pitch of the antenna units U is set to, for example, $\lambda/4$ or less and/or $\lambda/5$ or less in which $\lambda$ is a wavelength of the microwave. The wavelength $\lambda$ is, for example, 25 mm, and the array pitch in this case is set to, for example, 6.25 mm or less and/or 5 mm or less.

The scanning antenna 1000 changes phases of microwaves excited (re-radiated) from each patch electrode 15 by changing a capacitance value of the liquid crystal capacitance of the antenna unit U. Therefore, a preferable liquid crystal material of the liquid crystal layer LC1 has large anisotropy ($\Delta\varepsilon_m$) of a dielectric constant $m(\varepsilon_m)$ for the microwave and/or small tan $\delta_m$ (dielectric loss tangent for the microwave). For example, a liquid crystal material of which $\Delta\varepsilon_m$ is 4 or more and tan $\delta_m$ is 0.02 or less (both of them are values of 19 GHz) as described in SID 2015 DIGEST pp. 824 to 826 written by M. Wittek et al. can be appropriately used. In addition to this material, a liquid crystal material of which $\Delta\varepsilon_m$ is 0.4 or more and tan $\delta_m$ is 0.04 or less as described in Polymer 55 vol. August, pp. 599 to 602 (2006) written by Kuki can be used.

Although the dielectric constant of the liquid crystal material generally has frequency dispersion, the dielectric anisotropy ($\Delta\varepsilon_m$) for the microwave has a positive correlation with refractive index anisotropy ($\Delta n$) for visible light. For this reason, it can be preferable that a liquid crystal material for the antenna unit for the microwave be a material having a large refractive index anisotropy ($\Delta n$) for the visible light. Here, when $\Delta n$ (birefringence) for light of 550 nm is used as an index, a nematic liquid crystal of which $\Delta n$ is 0.3 or more, and preferably 0.4 or more is used for the antenna unit for the microwave. An upper limit of $\Delta n$ is not particularly limited. A thickness of the liquid crystal layer LC1 is set to, for example, 1 µm or more to 500 µm or less.

Figure 3:
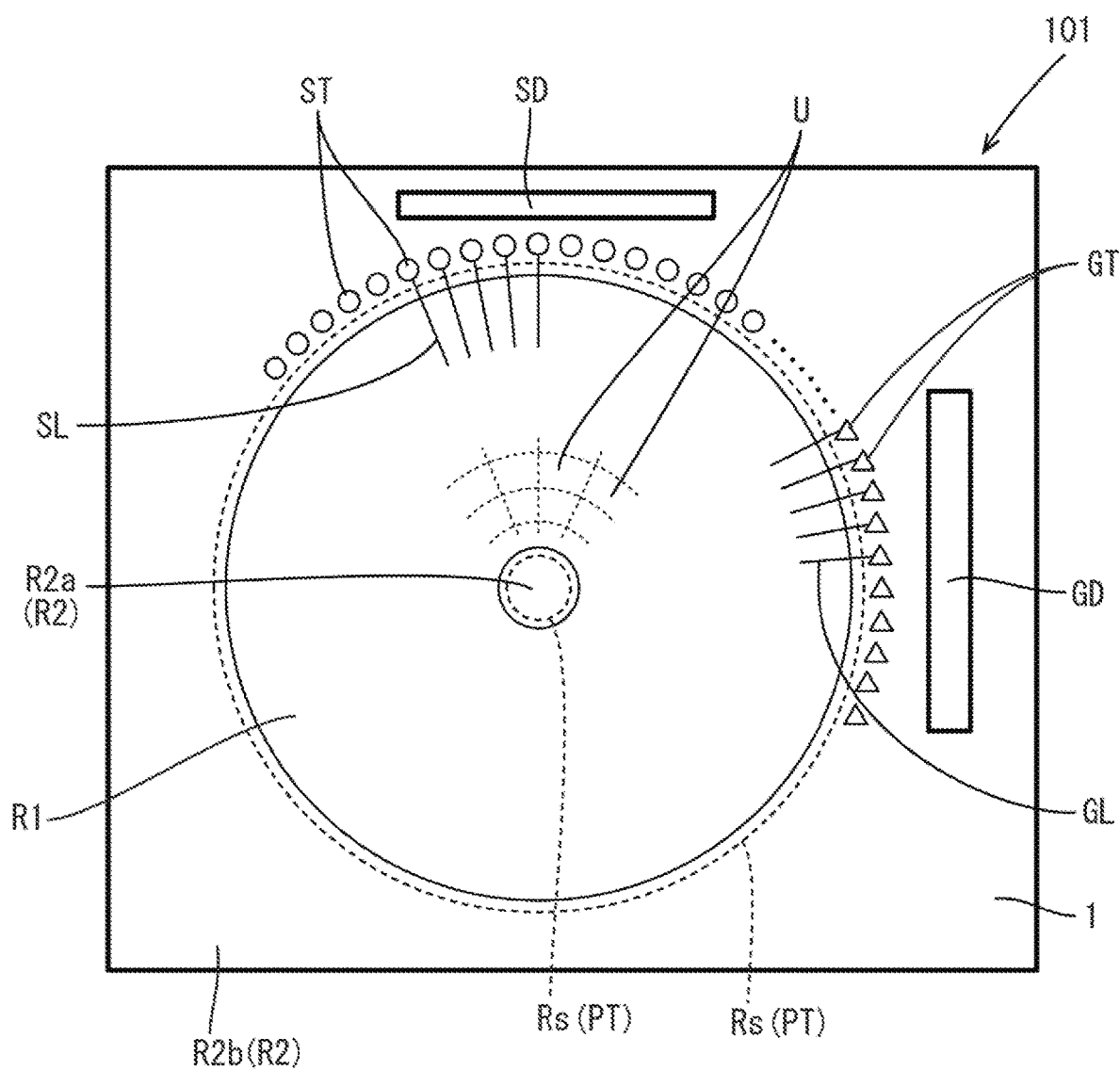
FIG. 3 is a plan view schematically showing a thin film transistor (TFT) substrate included in the scanning antenna.
Figure 4:
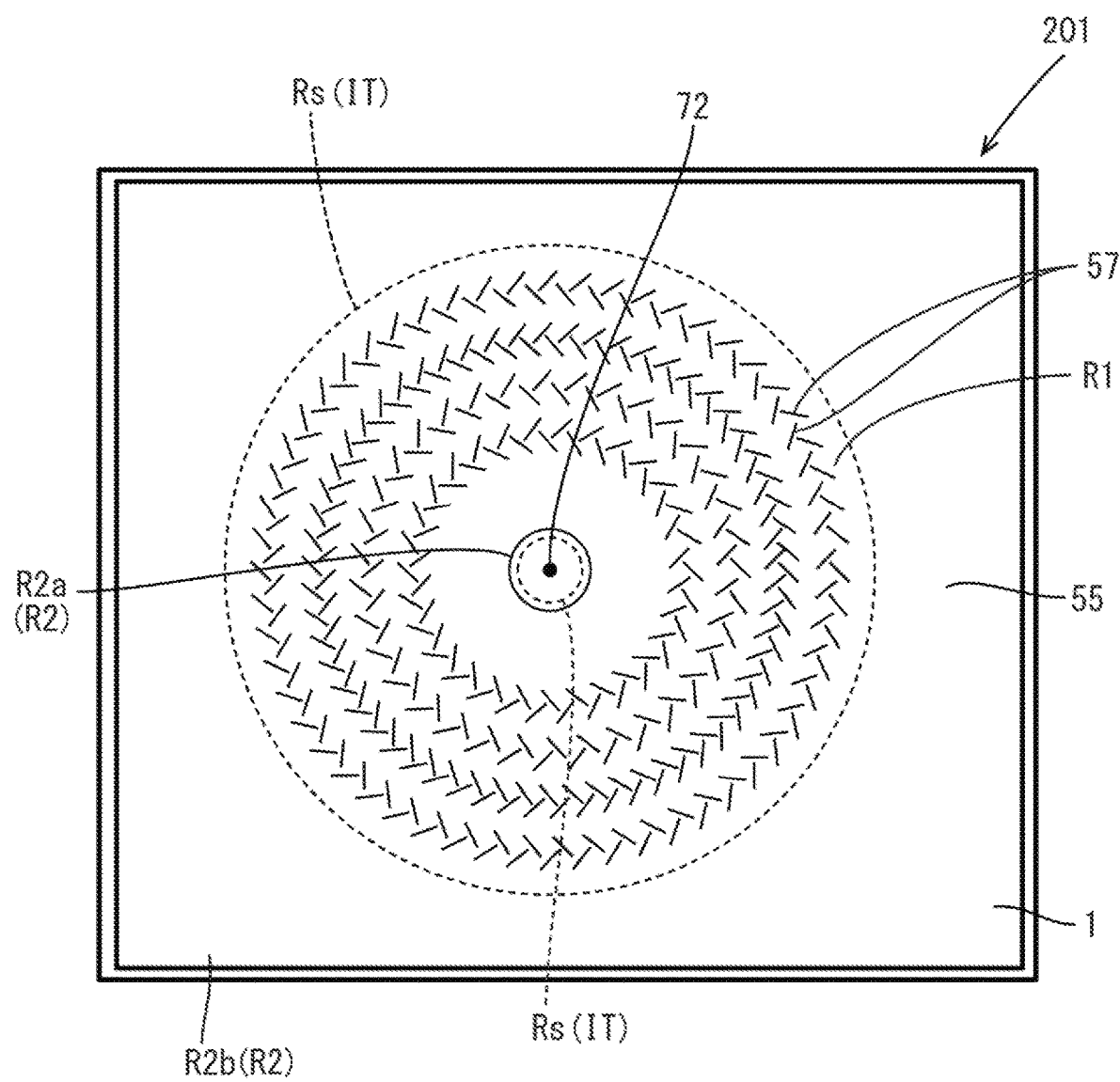
FIG. 4 is a plan view schematically showing a slot substrate included in the scanning antenna.

FIG. 3 is a plan view schematically showing the TFT substrate the scanning antenna 1000, and FIG. 4 is a plan view schematically showing the slot substrate 201 included in the scanning antenna 1000. It should be noted that a region of the TFT substrate 101 and a region of the slot substrate 201 that correspond to the antenna unit U are together referred to as an "antenna unit region" for convenience of explanation, and the same reference symbols as that of the antenna unit are used as reference symbols of the antenna unit region. As shown in FIGS. 3 and 4, in the TFT substrate 101 and the slot substrate 201, a region defined by antenna unit regions U that are two-dimensionally arranged is referred to as a "transmission/reception region R1", and a region other than the transmission/reception region R1 is referred to as a "non-transmission/reception region R2". In the non-transmission/reception region R2, a terminal portion, a drive circuit, and the like are arranged.

The transmission/reception region R1 has a ring shape when viewed in a plane. The non-transmission/reception region R2 includes a first non-transmission/reception region R2a positioned at a central portion of the transmission/reception region R1 and a second non-transmission/reception region R2b disposed at a circumference of the transmission/reception region R1. An outer diameter of the transmission/reception region R1 is, for example, 200 mm or more to 1,500 mm or less, and is appropriately set depending on a communication amount or the like.

Gate bus lines GL and source bus lines SL supported by the dielectric substrate 1 are provided on the transmission/reception region R1 of the TFT substrate 101, and driving of each antenna unit region U is controlled by using these wirings. Each antenna unit region U includes the TFT 10 and the patch electrode 15 electrically connected to the TFT 10. A source electrode of the TFT 10 is electrically connected to a source bus line SL, and a gate electrode of the TFT 10 is electrically connected to a gate bus line GL. In addition, a drain electrode of the TFT 10 is electrically connected to the patch electrode 15.

In the non-transmission/reception region R2 (the first non-transmission/reception region R2a and the second non-transmission/reception region R2b), seal regions Rs in which a sealant (not shown) is formed so as to surround the transmission/reception region R1 are arranged. The sealant has a function of adhering the TFT substrate 101 and the slot substrate 201 to each other and sealing the liquid crystal material (liquid crystal layer LC1) between the TFT substrate 101 and the slot substrate 201, or the like.

Gate terminal portions GT, a gate driver GD, source terminal portions ST, and a source driver SD are arranged outside the seal region Rs of the non-transmission/reception region R2. Each gate bus line GL is connected to the gate driver GD through the gate terminal portion GT, and each source bus line SL is connected to the source driver SD through the source terminal portion ST. It should be noted that both of the source driver SD and the gate driver GD are formed on the dielectric substrate 1 of the TFT substrate 101 in the present embodiment, but one or both of the source driver SD and the gate driver GD may also be formed on the dielectric substrate 51 of the slot substrate 201.

In addition, transfer terminal portions PT are provided in the non-transmission/reception region R2. The transfer terminal portions PT are electrically connected to the slot electrode 55 of the slot substrate 201. In the present embodiment, the transfer terminal portions PT are arranged in both of the first non-transmission/reception region R2a and the second non-transmission/reception region R2b. In another embodiment, the transfer terminal portions PT may be arranged in only any one of the first non-transmission/reception region R2a and the second non-transmission/reception region R2b. In addition, in the present embodiment, the transfer terminal portions PT are arranged in the seal regions Rs. For this reason, a conductive resin containing conductive particles (conductive beads) is used as the sealant.

As shown in FIG. 4, in the slot substrate 201, the slot electrode 55 is formed over the transmission/reception region R1 and the non-transmission/reception region R2 on the dielectric substrate 51. In FIG. 4, a surface of the slot substrate 201 viewed from the liquid crystal layer LC1 is shown, and for convenience of explanation, the alignment film M2 formed on the outermost surface is omitted.

In the transmission/reception region R1 of the slot substrate 201, slots 57 are arranged in the slot electrode 55. These slots 57 are assigned one by one to the antenna unit regions U of the TFT substrate 101, respectively. In the present embodiment, the slots 57 including a pair of slots 57 extending in directions substantially orthogonal to each other are arranged in a concentric shape so as to form the radial inline slot antenna. Since the scanning antenna 1000 has such a pair of slots 57, the scanning antenna 1000 can transmit and receive circularly polarized waves.

In the non-transmission/reception region R2 of the slot substrate 201, terminal portions IT of the slot electrode 55 are provided. The terminal portions IT are electrically connected to the transfer terminal portions PT of the TFT substrate 101. In the present embodiment, the terminal portions IT are arranged in the seal regions Rs, and are electrically connected to the corresponding transfer terminal portions PT by the sealant formed of the conductive resin containing the conductive particles (conductive beads), as described above.

In addition, in the first non-transmission/reception region R2a, the feeding pin 72 is provided so as to be disposed at the center of a concentric circle formed by the slots 57. The microwaves are supplied to the waveguide 301 constituted by the slot electrode 55, the reflective conductive plate 65, and the dielectric substrate 51 by the feeding pin 72. The feeding pin 72 is connected to a feeding device 70. A feeding manner may be any one of a direct-coupling feeding manner and an electromagnetic coupling feeding manner, or a known feeding structure can be adopted.

Hereinafter, the TFT substrate 101, the slot substrate 201, and the waveguide 301 will be described in detail.

(Structure of TFT Substrate 101)

Figure 5:
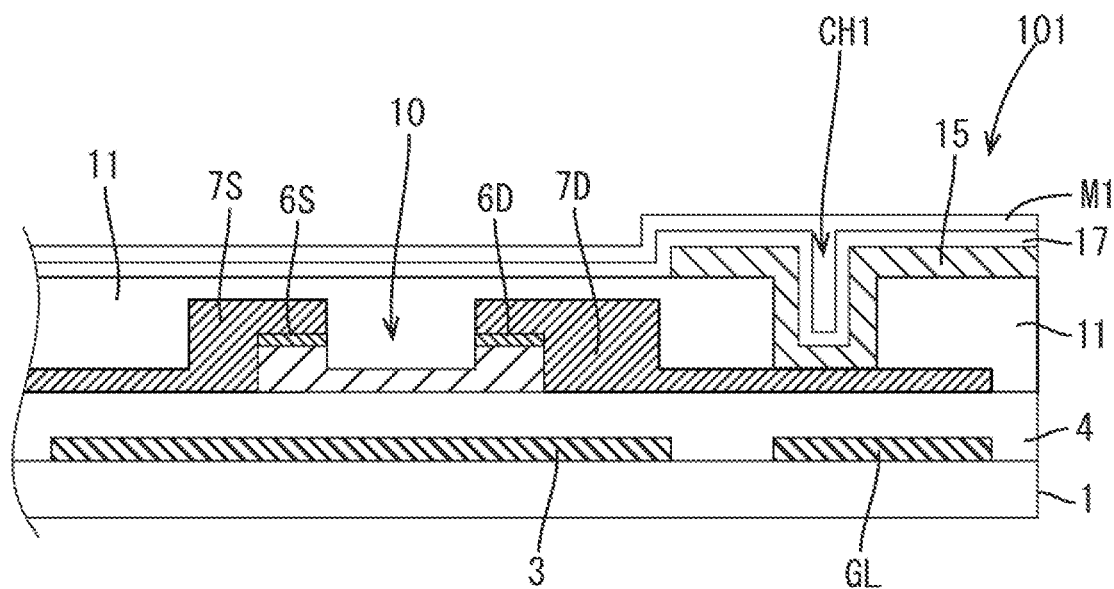
FIG. 5 is a cross-sectional view schematically showing an antenna unit region of the TFT substrate.
Figure 6:
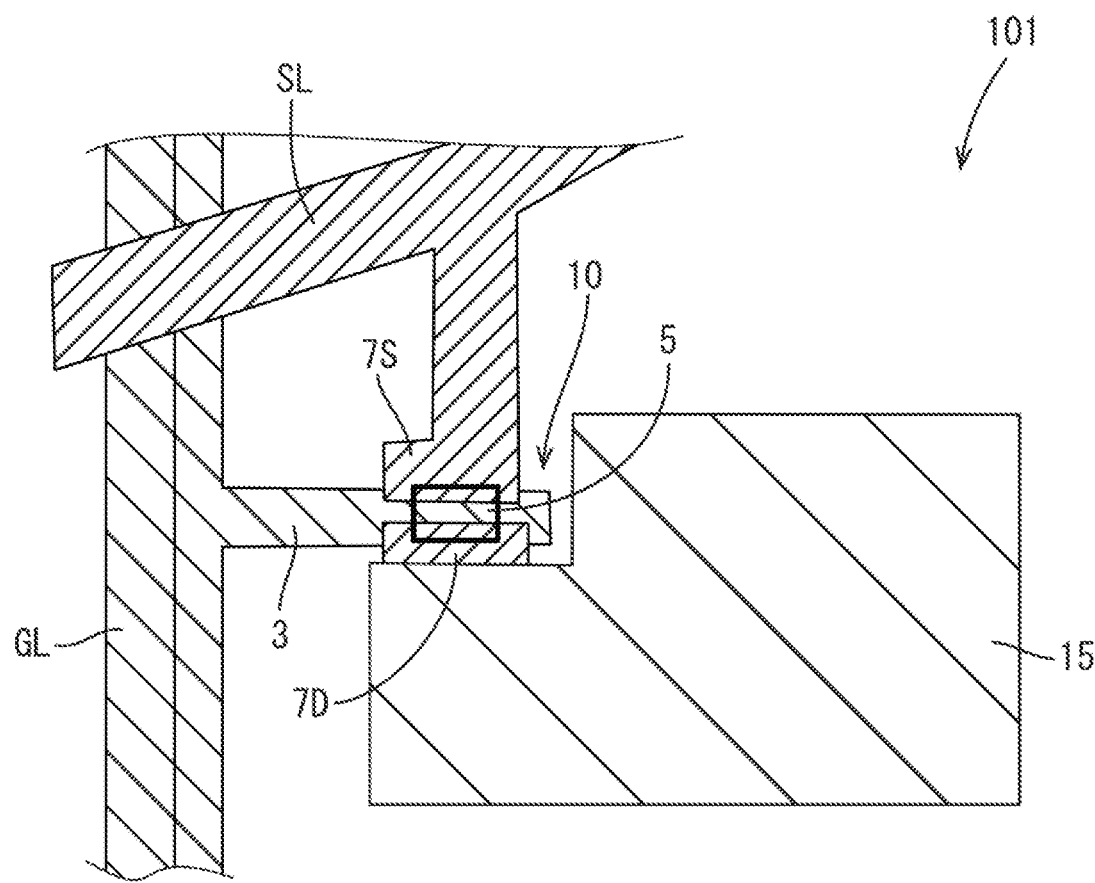
FIG. 6 is a plan view schematically showing the antenna unit region of the TFT substrate.

FIG. 5 is a cross-sectional view schematically showing the antenna unit region U of the TFT substrate 101, and FIG. 6 is a plan view schematically showing the antenna unit region U of the TFT substrate 101. In FIGS. 5 and 6, configurations of cross sections of a part of the transmission/reception region R1 are shown.

Each antenna unit region U of the TFT substrate 101 includes the dielectric substrate (first dielectric substrate) 1, the TFT 10 supported on the dielectric substrate 1, a first insulating layer 11 covering the TFT 10, the patch electrode 15 formed on the first insulating layer 11 and electrically connected to the TFT 10, a second insulating layer 17 covering the patch electrode 15, and the alignment film M1 covering the second insulating layer 17.

The TFT 10 includes a gate electrode 3, a semiconductor layer 5 having an island shape, a gate insulating layer 4 disposed between the gate electrode 3 and the semiconductor layer 5, a source electrode 7S, and a drain electrode 7D.

The TFT 10 according to the present embodiment is a channel etch type TFT having a bottom gate structure. It should be noted that TFTs having other structures may be used in another embodiment.

The gate electrode 3 is electrically connected to the gate bus line GL, and receives a scanning signal supplied from the gate bus line GL. The source electrode 7S is electrically connected so the source bus line SL, and receives a data signal supplied from the source bus line SL. The gate electrode 3 and the gate bus line GL may be formed of the same conductive film (gate conductive film). In addition, the source electrode 7S, the drain electrode 7D, and the source bus line SL may be formed of the same conductive film (source conductive film). The gate conductive film and the source conductive film are, for example, metal films. A layer formed using the gate conductive film may be referred to as a "gate metal layer", and a layer formed using the source conductive film may be referred to as a "source metal layer".

The semiconductor layer 5 is disposed so as to overlap with the gate electrode 3 with the gate insulating layer 4 interposed therebetween. As shown in FIG. 5, a source contact layer 6S and a drain contact layer 6D are formed on the semiconductor layer 5. The source contact layer 6S and the drain contact layer 6D are disposed, respectively, at both sides of a region (channel region) in which a channel is formed in the semiconductor layer 5, so as to face each other. In the present embodiment, the semiconductor layer 5 is an intrinsic amorphous silicon (i-a-Si) layer, and the source contact layer 6S and the drain contact layer 6D are an $n^+$-type amorphous silicon ($n^+$-a-Si) layer. It should be noted that the semiconductor layer 5 may be a polysilicon layer, an oxide semiconductor layer, or the like, in another embodiment.

The source electrode 7S is provided so as to be in contact with the source contact layer 6S, and is connected to the semiconductor layer 5 through the scarce contact layer 6S. The drain electrode 7D is provided so as to be in contact with the drain contact layer 6D, and is connected to the semiconductor layer 5 through the drain contact layer 6D.

The first insulating layer 11 has a contact hole CH1 reaching the drain electrode 7D of the TFT 10.

The patch electrode 15 is provided on the first insulating layer 11 and in the contact hole CH1, and is in contact with the drain electrode 7D in the contact hole CH1. The patch electrode 15 is mainly formed of a metal layer. It should be noted that the patch electrode 15 may be a metal electrode formed of only a metal layer. A material of the patch electrode 15 may be the same as those of the source electrode 7S and the drain electrode 7D. A thickness of the metal layer in the patch electrode 15 (a thickness of the patch elect rode 15 is a case where the patch electrode 15 is the metal electrode) may be the same as those of the source electrode 7S and the drain electrode 7D, but is preferably larger than those of the source electrode 7S and the drain electrode 7D. When the thickness of the patch electrode 15 is large, transmittance of the electromagnetic wave is suppressed to be low, such that a sheet resistance of the patch electrode is reduced, and loss that vibrations of free electrons in the patch electrode are changed to heat is reduced.

In addition, a CS bus line CL may be provided using the same conductive film as that of the gate bus line GL. The CS bus line CL may be disposed so as to overlap with the drain electrode 7D (or an extending portion of the drain electrode 7D) with the gate insulating layer 4 interposed therebetween to constitute an auxiliary capacitance CS having the gate insulating layer 4 as a dielectric layer.

In the present embodiment, the patch electrode 15 is formed in a layer different from the source metal layer. For this reason, a thickness of the source metal layer and a thickness of the patch electrode 15 can be controlled independently of each other.

The patch electrode 15 may include a Cu layer or an Al layer as a main layer. Performance of the scanning antenna is correlated with an electric resistance of the patch electrode 15, such that a thickness of the main layer of the patch electrode 15 is set so as to obtain a desired resistance. It is preferable that the patch electrode 15 have a resistance low enough not to hinder vibrations of electrons. The thickness of the metal layer in the patch electrode 15 is set to, for example, 0.5 μm or more when the metal layer is an Al layer.

The alignment film M1 is formed by using the liquid crystal alignment agent described above.

The TFT substrate 101 is produced by, for example, a method to be described below. First, the dielectric substrate 1 is prepared. For example, a glass substrate, a plastic substrate having heat resistance, or the like can be used as the dielectric substrate 1. The gate metal layer including the gate electrode 3 and the gate bus line GL is formed on the dielectric substrate 1.

The gate electrode 3 can be formed integrally with the gate bus line GL. Here, the gate conductive film (of which a thickness is, for example, 50 nm or more to 500 nm or less) is formed on the dielectric substrate 1 by a sputtering method or the like. Then, the gate electrode 3 and the gate bus line GL are formed by patterning the gate conductive film. A material of the gate conductive film is not particularly limited, and can be a metal such as aluminum (Al), tungsten (W), molybdenum (Mo), tantalum (Ta), chromium (Cr), titanium (Ti), copper (Cu), or the like, or alloys or nitrides thereof. Here, a laminated film in which MoN (of which a thickness is, for example, 50 nm), Al (of which a thickness is, for example, 200 nm), and MoN (of which a thickness is, for example, 50 nm) are sequentially laminated is formed as the gate conductive film.

Then, the gate insulating layer 4 is formed so as to cover the gate metal layer. The gate insulating layer 4 can be formed by a chemical vapor deposition (CVD) method or the like. A silicon oxide ($SiO_2$) layer, a silicon nitride (SiNx) layer, a silicon oxynitride (SiOxNy; x>y) layer, a silicon nitride oxide (SiNxOy; x> y) layer, or the like may be appropriately used as the gate insulating layer 4. The gate insulating layer 4 may have a laminated structure. Here, a SiNx layer (of which a thickness is, for example, 410 nm) is formed as the gate insulating layer 4.

Then, the semiconductor layer 5 and a contact layer are formed on the gate insulating layer 4. Here, the semiconductor layer 5 having the island shape and the contact layer are obtained by sequentially forming and patterning an intrinsic amorphous silicon film (of which a thickness is, for example, 125 nm) and an $n^+$-type amorphous silicon firm (of which a thickness is, for example, 65 nm). It should be noted that a semiconductor film used in the semiconductor layer 5 is not limited to the amorphous silicon film. For example, an oxide semiconductor layer may be formed as the semiconductor layer 5. In this case, the contact layer may not be provided between the semiconductor layer 5 and the source and drain electrodes.

Then, the source metal layer including the source electrode 7S, the drain electrode 7D, and the source bus line SL is formed by forming the source conductive film (of which a thickness is, for example, 50 nm or more to 500 nm or less) on the gate insulating layer 4 and the contact layer and patterning the source conductive film. In this case, the contact layer is also etched, such that the source contact layer 6S and the drain contact layer 6D separated from each other are formed.

A material of the source conductive film is not particularly limited, and can be a metal such as aluminum (Al), tungsten (W), molybdenum (Mo), tantalum (Ta), chromium (Cr), titanium (Ti), copper (Cu), or the like, or alloys or nitrides thereof. Here, a laminated film in which MoN (of which a thickness is, for example, 30 nm), Al (of which a thickness is, for example, 200 nm), and MoN (of which a thickness is, for example, 50 nm) are sequentially laminated is formed as the source conductive film.

Here, the source conductive film is formed by, for example, a sputtering method, and patterning (source/drain separation) of the source conductive film is performed by wet etching. Then, a portion of the contact layer positioned on a region that becomes the channel region of the semiconductor layer 5 is removed by, for example, dry etching to form a gap portion, thereby separating the contact layer into the source contact layer 6S and the drain contact layer 6D. In this case, in the gap portion, the vicinity of a surface of the semiconductor layer 5 is also etched (overetching).

Then, the first insulating layer 11 is formed so as to cover the TFT 10. In this example, the first insulating layer 11 is disposed so as to be in contact with the channel region or the semiconductor layer 5. In addition, the contact hole CH1 reaching the drain electrode 7D is formed in the first insulating layer 11 by a known photolithography technology.

The first insulating layer 11 may be an inorganic insulating layer such as a silicon oxide ($SiO_2$) film, a silicon nitride (SiNx) film, a silicon oxynitride (SiOxNy; x>y) film, a silicon nitride oxide (SiNxOy; x>y) film, or the like. Here, a SiNx layer having a thickness of, for example, 330 nm is formed as the first insulating layer 11 by, for example, a CCD method.

Then, a patch conductive film is formed on the first insulating layer 11 and in the contact hole CH1, and is patterned. As a result, the patch electrode 15 is formed in the transmission/reception region R1. It should be noted that a patch connection portion formed of the same conductive film (patch conductive film) as that of the patch electrode 15 is formed in the non-transmission/reception region R2. The patch electrode 15 is in contact with the drain electrode 7D within the contact hole CH1.

The same material as that of the gate conductive film or the source conductive film can be used as a material of the patch conductive film. However, it is preferable that the patch conductive film be set to be thicker than the gate conductive film and the source conductive film. An appropriate thickness of the patch conductive film is, for example, 1 μm or more to 30 μm or less. When the thickness of the patch conductive film is smaller than 1 μm, transmittance of the electromagnetic wave becomes about 30%, and a sheet resistance becomes 0.03 Ω/sq or more, such that it is likely that loss will be increased, and the thickness of the patch conductive film is larger than 30 μm, it is likely that patterning characteristics of the slot 57 will be deteriorated.

Here, a laminated film (MoN/Al/MoN) in which MoN (of which a thickness is, for example, 50 nm), Al (of which a thickness is, for example, 1000 nm), and MoN (of which a thickness is, for example, 50 nm) are sequentially laminated as the patch conductive film.

Then, the second insulating layer (of which a thickness is, for example, 100 nm or more to 300 nm or less) 17 is formed on the patch electrode 15 and the first insulating layer 11. The second insulating layer 17 is not particularly limited, and can be, for example, a silicon oxide ($SiO_2$) film, a silicon nitride (SiNx) film, a silicon oxynitride (SiOxNy; x>y) film, a silicon nitride oxide (SiNxOy; x>y) film, or the like. Here, for example, a SiNx layer having a thickness of 200 nm is formed as the second insulating layer 17.

Then, inorganic insulating films (the second insulating layer 17, the first insulating layer 11, and the gate insulating layer 4) are collectively etched by, for example, dry etching using a fluorine-based gas. In the etching, the patch electrode 15, the source bus line SL, and the gate bus line GL function as an etch stop. Therefore, a second contact hole reaching the gate bus line GL is formed in the second insulating layer 17, the first insulating layer 11, and the gate insulating layer 4, and a third contact hole reaching the source bus line SL is formed in the second insulating layer 17 and the first insulating layer 11. In addition, a fourth contact hole reaching the patch connection portion described above is formed in the second insulating layer 17.

Then, a conductive film (of which a thickness is 50 nm or more to 200 nm or less) is formed on the second insulating layer 17 and in the second contact hole, the third contact hole, and the fourth contact hole by, for example, a sputtering method. A transparent conductive film such as an indium tin oxide (ITO) film, an IZO film, a zinc oxide film (ZnO film), or the like can be used as the conductive film. Here, an ITO film having a thickness of, for example, 100 nm is used as the conductive film.

Then, an upper connection portion for a gate terminal, an upper connection portion for a source terminal, and an upper connection portion for a transfer terminal are formed by patterning the transparent conductive film. The upper connection portion for a gate terminal, the upper connection portion for a source terminal, and the upper connection portion for a transfer terminal are used in order to protect the electrodes or wirings exposed at each terminal portion. In this way, the gate terminal portion GT, the source terminal portion ST, and the transfer terminal portion PT are obtained.

Then, a coated film is formed to cover the second insulating layer 17 or the like by using the liquid crystal alignment agent described above, a solvent is removed by heating the coated film, and then the coated film is subjected to a predetermined alignment processing (for example, photo alignment processing), thereby forming the alignment film M1. In this way, the TFT substrate 101 can be produced.

(Structure of Slot Substrate 201)

Figure 7:
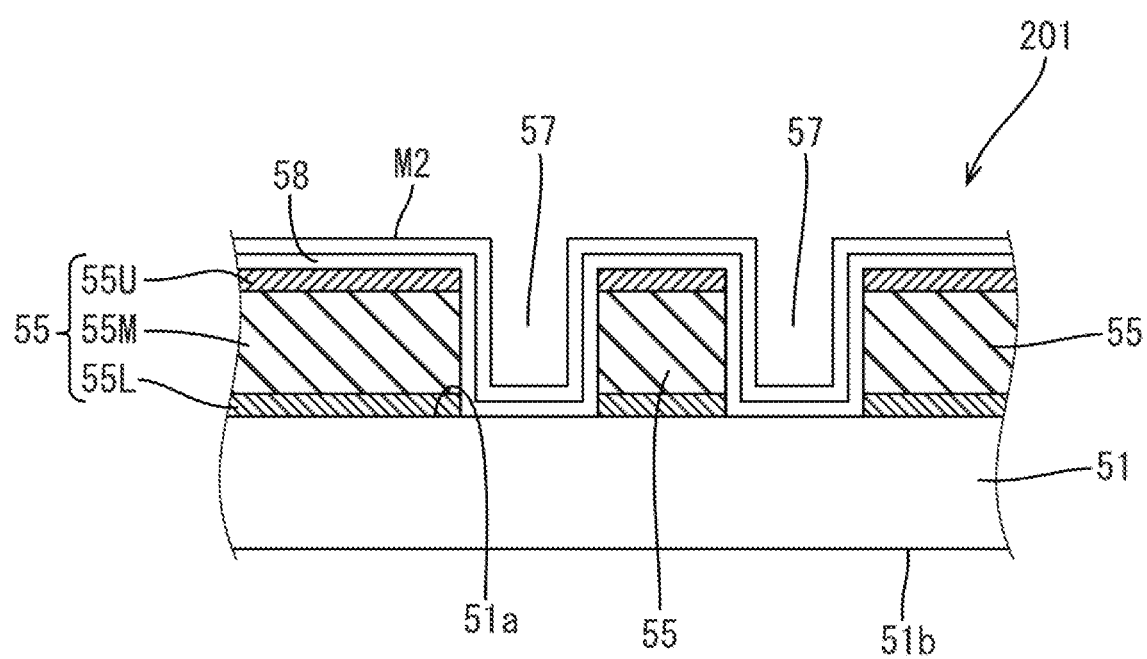
FIG. 7 is a cross-sectional view schematically showing an antenna unit region of the slot substrate.

Next, a structure of the slot substrate 201 will be described in more detail. FIG. 7 is a cross-sectional view schematically showing the antenna unit region U of the slot substrate 201.

The slot substrate 201 mainly includes the dielectric substrate (an example of the second dielectric substrate and the second substrate 200) 51, the slot electrode 55 formed on one plate surface (a plate surface facing the liquid crystal layer or a plate surface facing the TFT substrate 101) 51a of the dielectric substrate 51, a third insulating layer 58 covering the slot electrode 55, and the alignment film M2 covering the third insulating layer 58.

In the transmission/reception region R1 of the slot substrate 201, the slots 57 are formed in the slot electrode 55 (see FIG. 4). The slot 57 is an opening (groove) penetrating through the slot electrode 55. In this example, one slot 57 is assigned to each antenna unit region U.

The slot electrode 55 includes a main layer 55M such as a Cu layer, an Al layer, or the like. The slot electrode 55 may have a laminated structure in which it includes the main layer 55M and an upper layer 55U and a lower layer 55L disposed with the main layer 55M interposed therebetween.

A thickness of the main layer 55M may be set in consideration of a skin effect depending on a material, and may be, for example, 2 µm or more to 30 µm or less. The thickness of the main layer 55M is typically set to be larger than those of the upper layer 55U and the lower layer 55L.

In this example, the main layer 55M is a Cu layer, and the upper layer 55U and the lower layer 55L are Ti layers. Adhesion between the slot electrode 55 and the dielectric substrate 51 can be improved by disposing the lower layer 55L between the main layer 55M and the dielectric substrate 51. In addition, corrosion of the main layer 55M (for example, the Cu layer) can be suppressed by providing the upper layer 55U.

The third insulating layer 58 is formed on the slot electrode 55 and in the slot 57. A material of the third insulating layer 58 is not particularly limited, and can be, for example, a silicon oxide ($SiO_2$) film, a silicon nitride (SiNx) film, a silicon oxynitride (SiOxNy; x>y) film, a silicon nitride oxide (SiNxOy; x>y) film, or the like.

The alignment film M2 is formed by using the liquid crystal alignment agent described above, similarly to the alignment film M1 of the TFT substrate 101.

It should be noted that the terminal portions IT are provided in the non-transmission/reception region R2 of the slot substrate 201 (see FIG. 4). The terminal portion IT includes a part of the slot electrode 55, the third insulating layer 58 covering a part of the slot electrode 55, and an upper connection portion. The third insulating layer 58 has an opening (contact hole) reaching a part of the slot electrode 55. The upper connection portion is in contact with a part of the slot electrode 55 in the opening. In the present embodiment, the terminal portion IT is formed of a conductive layer such as an ITO film, an IZO film, or the like, is disposed in the seal region Rs, and is connected to the transfer terminal portion PT in the TFT substrate 101 by a seal resin containing conductive particles (for example, conductive beads such as Au beads, or the like).

The slot substrate 201 is produced by, for example, a method to be described below. First, the dielectric substrate 51 is prepared. A substrate having a high transmittance (a dielectric constant and a dielectric loss are small) for the electromagnetic wave, such as a glass substrate, a resin substrate, or the like can be used as the dielectric substrate 51. It is preferable that the dielectric substrate 51 be as thin as possible in order to suppress attenuation of the electromagnetic wave. For example, after components such as the slot electrode 55 and the like are formed on a surface of the glass substrate by a process to be described below, the glass substrate may be thinned from a back surface side thereof. As a result, a thickness of the glass substrate can be set to, for example, 500 µm or less. In general, a resin has a smaller dielectric constant and dielectric loss than those of a glass. When the dielectric substrate 51 is the resin substrate, a thickness of the dielectric substrate 51 is, for example, 3 µm or more to 300 µm or less. Polyimide or the like is used as a material of the resin substrate.

The slot electrode 50 having the slots 57 is obtained by forming a metal film on the dielectric substrate 51 and patterning the metal film. A Cu film (or an Al film) having a thickness of 2 µm or more to 5 µm or less may be used as the metal film. Here, a laminated film in which a Ti film, a Cu film, and a Ti film are sequentially laminated is used.

Then, the third insulating layer (of which a thickness is, for example, 100 nm or more to 200 nm or less) 58 is formed on the slot electrode 55 and in the slot 57. Here, the third insulating layer 58 is formed of a silicon oxide ($SiO_2$) film.

Then, in the non-transmission/reception region R2, the opening (contact hole) reaching a part of the slot electrode 55 is formed in the third insulating layer 58.

Then, a transparent conductive film is formed on the third insulating layer 58 and in the opening of the third insulating layer 58 and is patterned, such that an upper connection portion in contact with a part of the slot electrode 55 is formed in the opening, and a terminal portion IT for being connected to the transfer terminal portion PT of the TFT substrate 101 is obtained.

Then, a coated film is formed to cover the third insulating layer 58 by using the liquid crystal alignment agent described above, a solvent is removed by heating the coated film, and then the coated film is subjected to a predetermined alignment processing (for example, photo alignment processing), thereby forming the alignment film M2. In this way, the slot substrate 201 can be produced.

(Configuration of Waveguide 301)

The waveguide 301 is configured such that the reflective conductive plate 65 faces the slot electrode 55 with the dielectric substrate 51 interposed therebetween. The reflective conductive plate 65 is disposed so as to face a back surface of the dielectric substrate 51 with the air layer 54 interposed therebetween. Since the reflective conductive plate 65 constitutes the wall of the plate 65 have a thickness of three times or more, preferably, five times or more the skin depth. For example, an aluminum plate, a copper plate, or the like produced by cutting and having a thickness of several millimeters can be used as the reflective conductive plate 65.

For example, when the scanning antenna 1000 performs transmission, the waveguide 301 guides the microwaves supplied from the feeding pin 72 disposed at the center of the antenna units U arranged in the concentric shape so as to radially spread outward. When the microwaves move along the waveguide 301, the microwaves are cut off at each slot 57 of each antenna unit U, such that an electric field is generated by a principle of a so-called slot antenna, and electric charges are induced in the slot electrode 55 by an action of the electric field (that is, the microwaves are converted into vibrations of free electrons in the slot electrode 55). In each antenna unit U, a phase of vibrations of free electrons induced in the patch electrode 15 is controlled by changing a capacitance value of a liquid crystal capacitance through alignment control of a liquid crystal. When the electric charges are induced in the patch electrode 15, the electric field is generated (that is, the vibrations of the free electrons in the slot electrode 55 move to the vibrations of the free electrons in the patch electrode 15), and microwaves (radio waves) oscillate from the patch electrode 15 of each antenna unit U toward an outer side of the TFT substrate 101. An asimuth angle of a beam is controlled by adding together the microwaves (radio waves) oscillating from each antenna unit U and having different phases.

In another embodiment, the waveguide may have a two-layer structure in which it is divided into as upper layer and a lower layer. In this case, the microwaves supplied from the feeding pin first move in the lower layer so as to radially spread from the center of the lower layer toward an outer side of the lower layer, ascend to the upper layer at an outer wall portion of the lower layer, and then move in the upper layer so as to gather from an outer side of the upper layer to the center of the upper layer. By adopting such a two-layer structure, it becomes easy to uniformly spread the microwaves over each antenna unit U.

Figure 8:
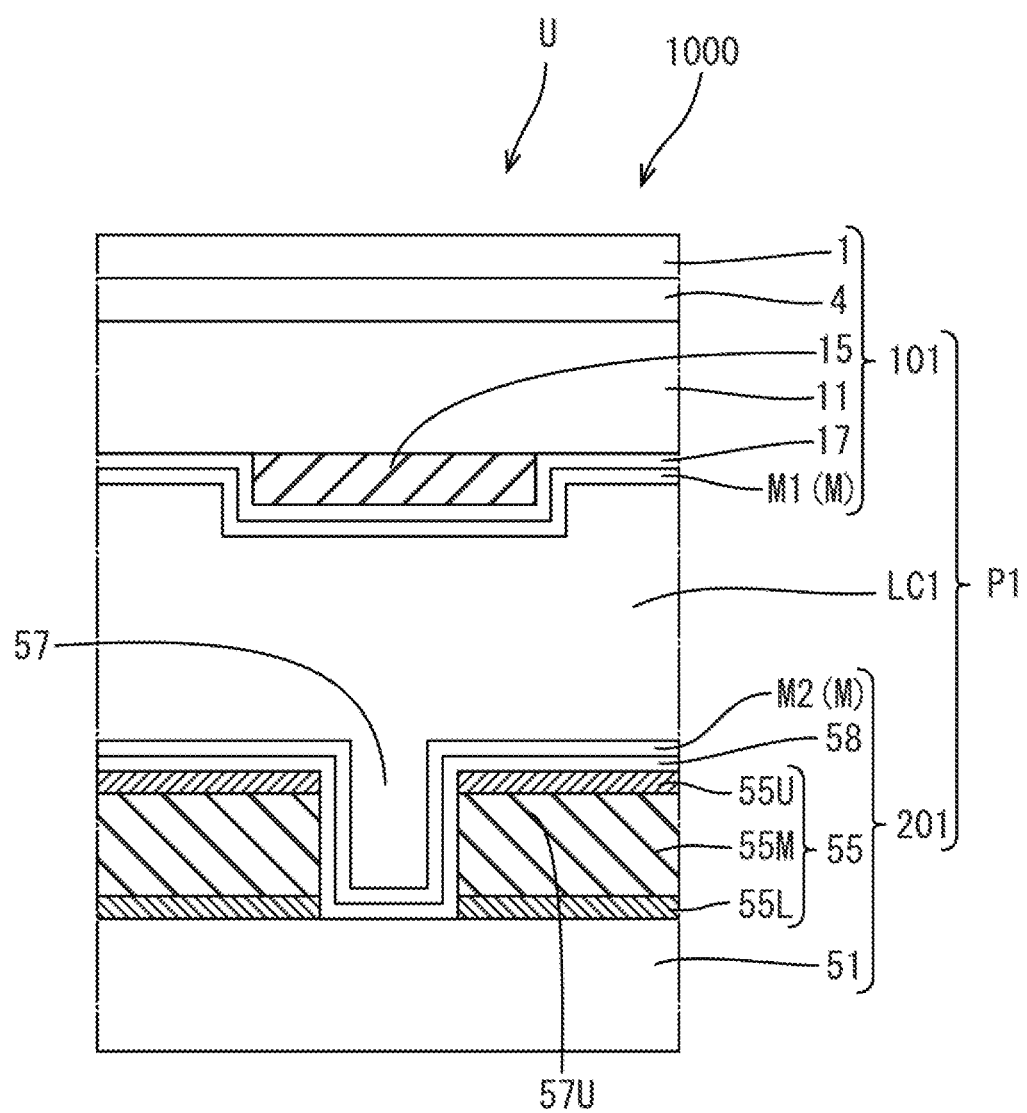
FIG. 8 is a cross-sectional view schematically showing a TFT substrate, a liquid crystal layer, and a slot substrate constituting an antenna unit of a scanning antenna.

FIG. 8 is a cross-sectional view schematically showing the TFT substrate 101, the liquid crystal layer LC1, and the slot substrate 201 constituting the antenna unit U of the scanning antenna 1000. As shown in FIG. 8, in the antenna unit U, the island-shaped patch electrode 15 of the TFT substrate 101, the hole-shaped (groove-shaped) slot 57 (slot electrode unit 57U) included in the slot electrode 55 of the slot substrate 201 face each other with the liquid crystal layer LC1 interposed therebetween. The scanning antenna 1000 includes a liquid crystal panel P1 including the liquid crystal layer LC1, a pair of TFT substrate 101 and slot substrate 201 disposed with the liquid crystal layer LC1 interposed therebetween and including the alignment films M1 and M2 formed on surfaces of the TFT substrate 101 and the slot substrate 201 facing the liquid crystal layer LC, respectively, by using the liquid crystal alignment agent described above. In the present description, the antenna unit U has a structure in which it includes one patch electrode 15 and the slot electrode 55 (slot electrode unit 57U) in which at least one slot 57 corresponding to the patch electrode 15 is disposed.

(Method of Producing Scanning Antenna)

At the time of producing the scanning antenna, the TFT substrate 101 and the slot substrate 201 are bonded to each other with the sealant interposed therebetween, and a process of filling the liquid crystal layer LC1 between the TFT substrate 101 and the slot substrate 201 is performed. The liquid crystal material (liquid crystal compound) constituting the liquid crystal layer LC1 may be filled between the TFT substrate 101 and the slot substrate 201 by a one drop fill (ODF) method or may be filled between the TFT substrate 101 and the slot substrate 201 by a vacuum injection method. In this way, the liquid crystal panel P1 of the scanning antenna 1000 including the liquid crystal layer LC1, the TFT substrate 101 and the slot substrate 201 can be obtained.

After the liquid crystal panel P1 is produced as described above, the reflective conductive plate 65 is appropriately assembled to the liquid crystal panel P1 so as to face an opposite surface 51b of the slot substrate 201 (second dielectric substrate 51) with the dielectric layer (air layer) 54 interposed therebetween. Through such processes, the scanning antenna according to the present embodiment is produced.

The alignment film formed of the liquid crystal alignment agent according to the present embodiment can be used for the scanning antenna having the configuration as described above.

Next, the liquid crystal lens will be described as a specific example or the liquid crystal device to which the liquid crystal alignment agent is applied.

[Basic Structure of Liquid Crystal Lens]

A liquid crystal lens 1000L is a liquid crystal optical element of which optical properties is made variable by using a liquid crystal, and can control a focal length by an applied voltage.

Figure 9:
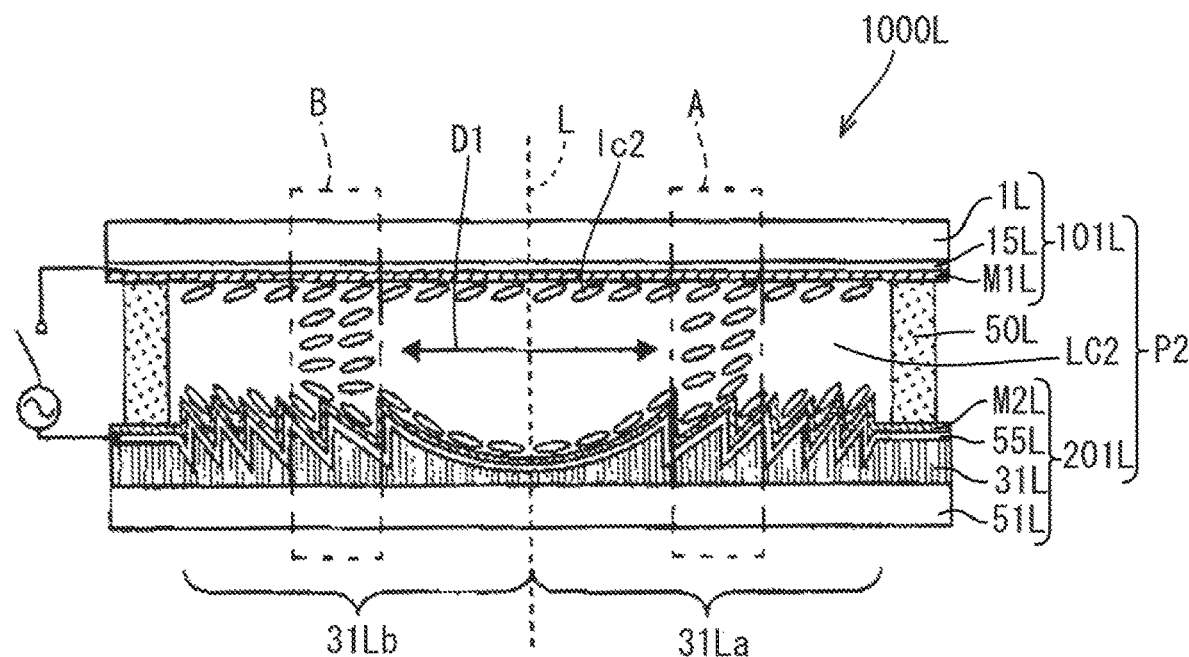
FIG. 9 is a cross-sectional view schematically showing a configuration of a liquid crystal lens in a state where a voltage is not applied.
Figure 10:
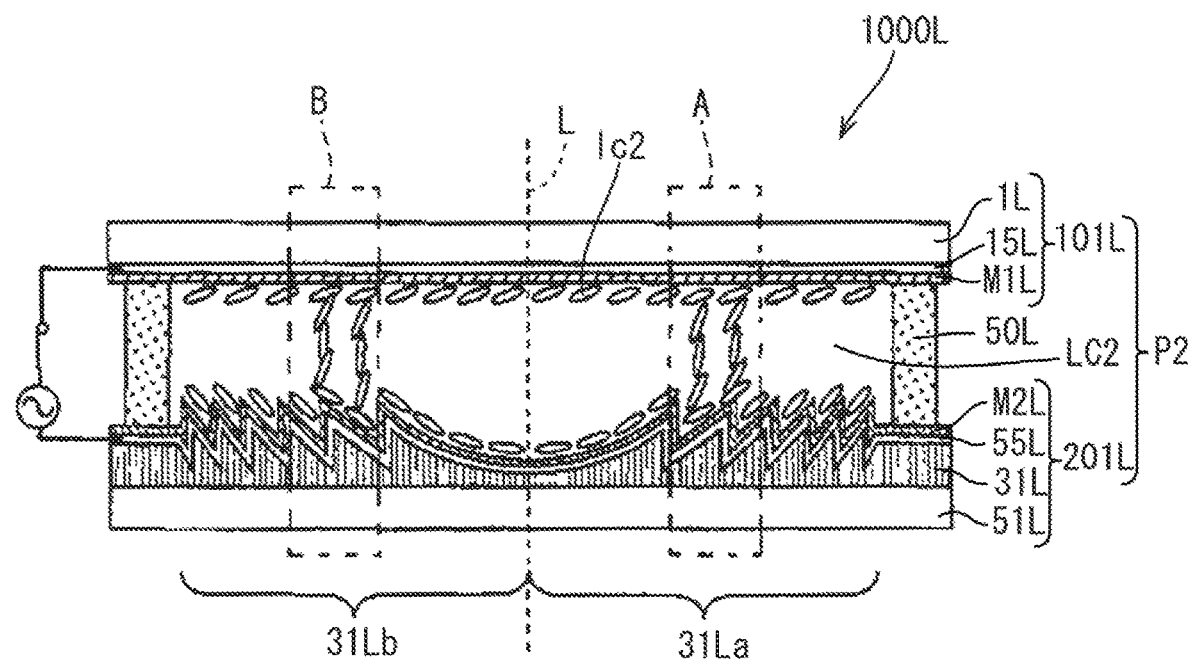
FIG. 10 is a cross-sectional view schematically showing a configuration of the liquid crystal lens in a state where a voltage is sufficiently applied such that a liquid crystal compound is switched.

FIG. 9 is a cross-sectional view schematically showing a configuration of the liquid crystal lens 1000L in a state where a voltage is not applied, and FIG. 10 is a cross-sectional view schematically showing a configuration of the liquid crystal lens 1000L in a state where a voltage is sufficiently applied such that a liquid crystal compound is switched. It should be noted that a liquid crystal compound (liquid crystal molecule) lc2 is illustrated only in a region A and a region B in FIGS. 9 and 10 for convenience of explanation.

The liquid crystal lens 1000L includes a liquid crystal panel P2 for the liquid crystal lens 1000L including a flat substrate 101L (an example of the first substrate 100), a lens-shaped substrate 201L (an example of the second substrate 200), and a liquid crystal layer LC2 (an example of the liquid crystal layer LC) disposed between the flat substrate 101L and the lens-shaped substrate 201L.

The flat substrate 101L includes a first transparent substrate 1L (an example of the first support substrate), a transparent electrode 15L formed on the first transparent substrate 1L, and an alignment film M1L (an example of the alignment film) formed to cover the transparent electrode 15L. The transparent electrode 15L is formed of, for example, a transparent conductive film such as an indium tin oxide (ITO) film, or the like. The alignment film M1L is formed of the liquid crystal alignment agent according to the present embodiment described above. In detail, a coated film is formed to cover the transparent electrode 15L by using the liquid crystal alignment agent, a solvent is removed by heating the coated film, and then the coated film is subjected to a predetermined alignment processing (for example, photo alignment processing in which linearly polarized ultraviolet rays are irradiated to the coated film at a predetermined angle), thereby forming the alignment film M1L. It should be noted that the rubbing processing may be performed as the alignment processing in another embodiment.

The lens-shaped substrate 201L includes a second transparent substrate 51L (an example of the second support substrate), a Fresnel lens structure 31L formed on the second transparent substrate 51L in a form in which respective lens surfaces divided in a concentric shape are connected to each other via stepped portions as an optical structure form, a transparent electrode 55L formed to cover the Fresnel lens structure 31L, and an alignment film M2L (an example of the alignment film) formed to cover the transparent electrode 55L. The Fresnel lens structure 31L is formed on the second transparent substrate 51L by an imprint (transfers) technology using a mold (die). The transparent electrode 55L is formed of, for example, a transparent conductive film such as an indium tin oxide (ITO) film, or the like. The alignment film M2L is formed of the liquid crystal alignment agent according to the present embodiment described above, similarly to the alignment film M1L. In detail, a coated film is formed to cover the transparent electrode 55L on the Fresnel lens structure 31L by using the liquid crystal alignment agent, a solvent is removed by heading the coated film, and then the coated film is subjected to a predetermined alignment processing (for example, photo alignment processing in which linearly polarized ultraviolet rays are irradiated to the coated film at a predetermined angle), thereby forming the alignment film M2L. It should be noted that the rubbing processing may be performed as the alignment processing in another embodiment.

The liquid crystal layer LC2 is interposed between the flat substrate 101L and the lens-shaped substrate 201L, and is sealed by a sealant 50L. The sealant 50L is interposed between the flat substrate 101L and the lens-shaped substrate 201L, and surrounds the liquid crystal layer LC2.

Details of the method of producing the liquid crystal lens 1000L, or the like are disclosed in, for example, Patent Document 4 (Japanese Patent Publication NO. 5698328).

As shown in FIG. 9, in a state where a voltage is not applied, a pretilt angle of the liquid crystal compound (liquid crystal molecule) lc2, by effects of the alignment films M1L and M2L is approximately 0°. A major axis of the liquid crystal compound (liquid crystal molecule) lc2 is aligned in a direction along a flat surface of the substrate (a direction of an arrow D1 in FIG. 9), on a surface of the alignment film M2L formed on the Fresnel lens structure 31L. As shown in FIG. 9, a pretile angle of the liquid crystal compound (liquid crystal molecule) lc2 is approximately 0° relative to lens surfaces 31La and 31Lb divided with a line L as a boundary in the state where a voltage is not applied, the line L being a line passing through the center of the liquid crystal lens 1000L. The divided lens surfaces 31La and 31Lb are slanted right-upwards and left-upwards relative to the second transparent substrate 51L, respectively. Therefore, in the region A of the divided lens surface 31La and the region B of the divided lens surface 31Lb, the liquid crystal compounds (liquid crystal molecules) lc2 are also initially aligned while being slanted right-upwards and left-upwards relative to the second transparent substrate 51L, respectively. An angle of a slanted surface of the Fresnel lens structure 31L serves to perform substantially the same function as that of the pretilt angle.

As shown in FIG. 10, when a voltage is applied to the liquid crystal layer LC2, the liquid crystal compounds (liquid crystal molecules) lc2 on the surface of the alignment film M1L are initially aligned while being slanted right-upwards, and the liquid crystal compounds (liquid Crystal molecules) lc2 in the region A of the divided lens surface 31La side are also initially aligned while being slanted right-upwards. Therefore, the liquid crystal compounds (liquid crystal molecules) lc2 on the divided lens surface 31La side slantly rise right-upwards. In addition, since the liquid crystal compounds (liquid crystal molecules) lc2 on the surface of the alignment film M1L, which are initially aligned while being slanted right-upwards, have a strong alignment restricting force or a high pretilt angle, most liquid crystal compounds (liquid crystal molecules) lc2 in the region B of the divided lens surface 31Lb, which are aligned while being slanted left-upwards also slantly rise right-upwards, that is, slantly rise in the same direction as that of the liquid crystal compounds (liquid crystal molecules) lc2 on the divided lens surface 31La, when a voltage is not applied. As described above, the liquid crystal compounds (liquid crystal molecule) lc2 in a state of slantly rising right-upwards predominate when a voltage is applied.

Also in the liquid crystal panel P2 of the liquid crystal lens 1000L as described above, the liquid crystal compound (liquid crystal molecule) having high polarity is used, similarly to the liquid crystal panel P1 of the scanning antenna 1000 described above.

The alignment film formed of the liquid crystal alignment agent according to the present embodiment can be used for the liquid crystal lens 1000L having the configuration as described above.

EXAMPLE

Hereinafter, the present invention will be described in more detail based on examples. It should be noted that the present invention is not limited at all by these examples.

Production of Liquid Crystal Panel for Scanning Antenna

Example 1

A TFT substrate having the same basic configuration as that of the TFT substrate 101 included in the liquid crystal panel P1 of the scanning antenna 1000 described above and a slot substrate having the same basic configuration as that of the slot substrate 201 included in the liquid crystal panel P1 similarly were prepared, respectively. An alignment film of the TFT substrate and an alignment film of the slot substrate both were formed by using an alignment agent 1 described below.

The alignment agent 1 is formed of a liquid composition obtained by mixing 4 parts by mass of polymethyl methacrylate (PMMA), 76 parts by mass of γ-butyrolactone (GBL), and 20 parts by mass of diethylene glycol diethyl ether (DEDE).

When forming the respective alignment films on the TFT substrate and the slot substrate, first, the alignment agent 1 was coated on the respective substrates by using a spin coater, thereby forming coated films formed of the alignment agent 1 on the respective substrates, respectively. Then, the respective coated films were heated at 70° C. for 5 minutes, and then further heated at 150° C. for 30 minutes, thereby removing a solvent in the coated film, or the like. Then, rubbing processing (alignment processing) was performed on the respective coated films of the TFT substrate and the slot substrate to form alignment films on the respective surfaces of the TFT substrate and the slot substrate, respectively, the alignment films being formed of the alignment agent 1.

It should be noted that measurement electrodes for measuring a voltage holding ratio (VHR) between the TFT substrate and the slot substrate on which the alignment films are formed, respectively, in an evaluation test to be described later, are formed on these substrates, respectively. The measurement electrodes are each formed of a transparent conductive film (ITO) and are formed on the outermost surfaces of the respective substrates facing the liquid crystal layer, respectively. An area of the measurement electrode when viewed in a plane is 1 cm$^2$, and the measurement electrodes are provided on the respective substrates to face each other.

A thermosetting sealant (trade name "HC-1413FP" produced by Mitsui Chemicals, Inc.) was drawn in a frame shape on surfaces (the surface facing liquid crystal layer and a surface facing the alignment film) of the TFT substrate using a seal dispenser. Then, the TFT substrate and the slot substrate were bonded to each other by using the sealant such that the sealant is interposed therebetween, and heated at 130° C. for 40 minutes, thereby producing an empty panel in which the liquid crystal material is not filled. Then, the liquid crystal material (Δε=10, 1 kHz, 20° C.) was filled in the empty panel through an injection port provided at a part of the thermosetting sealant in the frame shape by the vacuum injection method. It should be noted that the injection port was sealed by using a sealing agent (trade name "TB3026E" produced by ThreeBond Co., Ltd.).

Then, re-alignment processing of the liquid crystal compounds was performed by heating the panel in which the liquid crystal material is filled at 110° C. for 20 minutes, and a liquid crystal panel in which the liquid crystal compounds were homogeneously aligned (the liquid crystal compounds are arranged in parallel with the surface of the respective surfaces and arranged in the same direction) was obtained.

Example 2

A liquid crystal panel was produced in the same manner as in Example 1 except chat an alignment agent 2 formed of a liquid composition obtained by mixing 4 parts by mass of PMMA, 76 parts by mass of GBL, and 20 parts by mass of diisobutyl ketone (DIBK) was used as the alignment agent.

Example 3

A liquid crystal panel was produced in the same manner as in Example 1 except that an alignment agent 3 formed of a liquid composition obtained by mixing 4 parts by mass of PMMA, 76 parts by mass of GBL, and 20 parts by mass of diethylene glycol ethyl methyl ether (DEDM) was used as the alignment agent.

Example 4

A liquid crystal panel was produced in the same manner as in Example 1 except that an alignment agent 4 formed of a liquid composition obtained by mixing 4 parts by mass of PMMA, 76 parts by mass of GBL, and 20 parts by mass of 1-butoxy-2-propanol (BP) was used as the alignment agent.

Example 5

A liquid crystal panel was produced in the same manner as in example 1 except that an alignment agent 5 formed of a liquid composition obtained by mixing 4 parts by mass of PMMA, 76 parts by mass of GBL, and 20 parts by mass of butyl cellosolve (BC) was used as the alignment agent.

Example 6

A liquid crystal panel was produced in the same manner as in Example 1 except that an alignment agent 6 formed of a liquid composition obtained by mixing 4 parts by mass of PMMA, 76 parts by mass of GBL, and 20 parts by mass of cyclopentanone (CP) was used as the alignment agent.

Example 7

A liquid crystal panel was produced in the same manner as in Example 1 except that an alignment agent 7 formed of a liquid composition obtained by mixing 4 parts by mass of PMMA, 20 parts by mass of GBL, and 76 parts by mass of CP was used as the alignment agent.

Comparative Example 1

A liquid crystal panel was produced in the same manner as in Example 1 except that an alignment agent 8 formed of a liquid composition obtained by mixing 4 parts by mass of PMMA, 76 parts by mass of N-methyl-2-pyrrolidone (NMP), and 20 parts by mass of BC was used as the alignment agent.

Comparative Example 2

A liquid crystal panel was produced in the same manner as in Example 1 except that an alignment agent 9 formed of a liquid composition obtained by mixing 4 parts by macs of PMMA, 76 parts by mass of 1-ethyl-2-pyrrolidone (NEP), and 20 parts by mass of BC was used as the alignment agent.

Comparative Example 3

A liquid crystal panel was produced in the same manner as in Example 1 except that an alignment agent 10 formed of a liquid composition obtained by mixing 4 parts by mass of PMMA, 20 parts by mass of NMP, and 76 parts by mass of BC was used as the alignment agent.

Comparative Example 4

A liquid crystal panel was produced in the same manner as in Example 1 except that an alignment agent 11 formed of a liquid composition obtained by mixing 4 parts by mass of PMMA, 20 parts by mass of NEP, and 76 parts by mass of BC was used as the alignment agent.

Comparative Example 5

A liquid crystal panel was produced in the same manner as in Example 1 except that the alignment film is not formed.

Evaluation of Voltage Holding Ratio

Voltage holding ratios (VHR) of the respective liquid crystal panels of Examples 1 to 7 and Comparative Examples 1 to 5 were measured by using the measurement electrodes described above. In measurement of the voltage holding ratio (VHR), a VHR measurement system (model: 6254, produced by TOYO Corporation) was used, an applied voltage was 1 V, a holding nine was 16.67 ms, and a measurement temperature was 70° C. A measurement result of a voltage holding ratio of each liquid crystal panel is shown in Table 1.

(90%) which is equivalent to that of the liquid crystal panel of Comparative Example 5 in which the alignment film in not formed.

In contrast, in the liquid crystal panels of Comparative Examples 1 to 4, NMP and NEP, which are compounds containing a nitrogen atom, were used as the organic solvent of the alignment agent, which resulted in low voltage holding ratios. It is estimated that NMP and NEP remaining in the alignment film flowed out to the liquid crystal layer including the liquid crystal compound having high polarity after the liquid crystal panel is produced, and acted on the liquid crystal compound to generate ionic components in the liquid crystal layer, and as a result, the VHR is decreased.

In the scanning antenna using the crystal liquid as described above, the liquid crystal compound having high polarity is used to increase the dielectric anisotropy ($\Delta\varepsilon$). Therefore, it can be said that the liquid crystal layer formed of the liquid crystal compound as described above has a strong action of flowing the organic solvent in the alignment film out to the liquid crystal layer.

TABLE 1

| | ALIGNMENT AGENT | ALIGNMENT FILM FORMING MATERIAL | ORGANIC SOLVENT FOR ALIGNMENT AGENT | | | |
|---|---|---|---|---|---|---|
| | | PMMA (PARTS) | GBL (PARTS) | DEDE (PARTS) | DIBK (PARTS) | DEDM (PARTS) |
| EXAMPLE 1 | 1 | 4 | 76 | 20 | | |
| EXAMPLE 2 | 2 | 4 | 76 | | 20 | |
| EXAMPLE 3 | 3 | 4 | 76 | | | 20 |
| EXAMPLE 4 | 4 | 4 | 76 | | | |
| EXAMPLE 5 | 5 | 4 | 76 | | | |
| EXAMPLE 6 | 6 | 4 | 76 | | | |
| EXAMPLE 7 | 7 | 4 | 20 | | | |
| COMPARATIVE EXAMPLE 1 | 8 | 4 | | | | |
| COMPARATIVE EXAMPLE 2 | 9 | 4 | | | | |
| COMPARATIVE EXAMPLE 3 | 10 | 4 | 76 | | | |
| COMPARATIVE EXAMPLE 4 | 11 | 4 | 76 | | | |
| COMPARATIVE EXAMPLE 5 | NO ALIGNMENT FILM | | | | | |

| | ORGANIC SOLVENT FOR ALIGNMENT AGENT | | | ORGANIC SOLVENT CONTAINING NITROGEN | | VHR (1 V, 16.67 ms, 70° C.) |
|---|---|---|---|---|---|---|
| | BP (PARTS) | BC (PARTS) | CP (PARTS) | NMP (PARTS) | NEP (PARTS) | |
| EXAMPLE 1 | | | | | | 90% |
| EXAMPLE 2 | | | | | | 90% |
| EXAMPLE 3 | | | | | | 90% |
| EXAMPLE 4 | 20 | | | | | 90% |
| EXAMPLE 5 | | 20 | | | | 90% |
| EXAMPLE 6 | | | 20 | | | 90% |
| EXAMPLE 7 | | | 76 | | | 90% |
| COMPARATIVE EXAMPLE 1 | | 20 | | 76 | | 40% |
| COMPARATIVE EXAMPLE 2 | | 20 | | | 76 | 30% |
| COMPARATIVE EXAMPLE 3 | | | | 20 | | 50% |
| COMPARATIVE EXAMPLE 4 | | | | | 20 | 45% |
| COMPARATIVE EXAMPLE 5 | NO ALIGNMENT FILM | | | | | 90% |

The term "Parts" shown in Table 1 means parts by mass. As shown in Table 1, it was confirmed that the liquid crystal panels of Examples 1 to 7 have a high voltage holding ratio In Comparative Examples 1 to 4, the solvent, which is problematic, has a structure in which the solvent contains a nitrogen atom (in particular, —N—CH$_2$—), and it is estimated that it is highly likely that the structure causes a decrease in the voltage holding ratio.

On the contrary, in Examples 1 to 7, the organic solvent used for the alignment agent contains a compound which has at least two functional groups selected from the group consisting of a methylene group, a methyl group, an ether group, a ketone group, and a hydroxyl group, and does not contain a nitrogen atom, and it is confirmed that such an organic solvent does not decrease the voltage holding ratio.

It should be noted that NMP and NEP are good solvents like GBL in terms of a capacity for dissolving the alignment film forming material. That is, it is estimated that polarity (high polarity) of the organic solvent itself is not a cause of decreasing the voltage holding ratio. However, considering the fact that high dielectric anisotropy (Δε) and high polarity of the liquid crystal compound is one of the causes of decreasing the voltage holding ratio, it is estimated that there is a possibility that the structure of the organic solvent in which the organic solvent contains a nitrogen atom (in particular, —N—CH$_2$—) is ionized in the liquid crystal layer.

Production of Liquid Crystal Panel for Liquid Crystal Lens

Example 8

A flat substrate having the same basic configuration as that of the flat substrate 101L included in the liquid crystal panel P2 of the liquid, crystal lens 1000L described above and a lens-shaped substrate having the same basic configuration as that of the lens-shaped substrate 201L included in the liquid crystal panel P2 similarly were prepared, respectively. An alignment film of the flat substrate and as alignment film of the lens-shaped substrate both were formed by using the same alignment agent 1 as that in Example 1.

When forming the respective alignment films on the flat substrate and the lens-shaped substrate, first, the alignment agent 1 was coated on the respective substrates by using a coating machine, thereby forming coated films formed of the alignment agent 1 on the respective substrates, respectively. Then, the respective coated films were heated at 70° C. for 5 minutes, and then further heated at 150° C. for 30 minutes, thereby removing a solvent in the coated film, or the like. Then, rubbing processing (alignment processing) was performed on the respective coated films of the flat substrate and the lens-shaped substrate to form alignment films on the respective surfaces of the flat substrate and the lens-shaped substrate, respectively, the alignment films being formed of the alignment agent 1.

It should be noted that measurement electrodes for measuring a voltage holding ratio (VHR) between the flat substrate and the lens-shaped substrate on which the alignment films are formed, respectively, are formed on these substrates, respectively, similarly to Example 1. The measurement electrodes are each formed of a transparent conductive film (ITO) and are formed on the outermost surfaces of the respective substrates facing the liquid crystal layer, respectively. An area of the measurement electrode when viewed in a plane is 1 cm$^2$, and the measurement electrodes are provided on the respective substrates to face each other.

A thermosetting sealant was drawn in a frame shape on surfaces (the surface facing liquid crystal layer and a surface facing the alignment film) of the flat substrate using a seal dispenser. Then, the flat substrate and the lens-shaped substrate were bonded to each other by using the sealant such that the sealant is interposed therebetween, and heated at 130° C. for 40 minutes, thereby producing an empty panel in which the liquid crystal material is not filled. Then, the same liquid crystal material (Δε=10, 1 kHz, 20° C.) as that in Example 1 was filled in the empty panel by the vacuum injection method.

Then, re-alignment processing of the liquid crystal compounds was performed by heating the panel in which the liquid crystal material is filled at 110° C. for 20 minutes, and a liquid crystal panel in which the liquid crystal compounds were homogeneously aligned (the liquid crystal compounds are arranged in parallel with the surface of the respective surfaces and arranged in the same direction) was obtained. In the lens-shaped substrate, the liquid crystal compound is aligned along a surface shape of the Fresnel lens structure.

Evaluation of Voltage Holding Ratio

A voltage holding ratio (VHR) of the liquid crystal panel of Example 8 was measured under the same condition as that of Example 1 or the like. As a result, it was confirmed that the voltage holding ratio of the liquid crystal panel of Example 8 is 90%, and the liquid crystal panel of Example 8 has an excellent voltage holding ratio.

EXPLANATION OF SYMBOLS

100: First substrate
110: First support substrate
M: Alignment film
LC: Liquid crystal layer
200: Second substrate
220: Second support substrate
P: Liquid crystal panel
1: Dielectric substrate (First dielectric substrate)
3: Gate electrode
4: Gate insulating layer
5: Semiconductor layer
6D: Drain contact layer
6S: Source contact layer
7D: Drain electrode
7S: Source electrode
10: TFT
11: First insulating layer
15: Patch electrode
17: Second insulating layer
51: Dielectric substrate (Second dielectric substrate)
55: Slot electrode
55L: Lower layer
55M: Main layer
55U: Upper layer
57: Slot
57U: Slot electrode unit
58: Third insulating layer
70: Feeding device
72: Feeding pin
80: Sealant
81: Liquid crystal injection port
82: Sealing portion
101: TFT substrate
201: Slot substrate
1000: Scanning antenna
U: Antenna unit (Antenna unit region)
CH1: Contact hole
LC1: Liquid crystal layer
P: Composite panel
GD: Gate driver
GL: Gate bus line GT: Gate terminal portion
SD: Source driver
SL: Source bus line
ST: Source terminal portion
PT: Transfer terminal portion
R1: Transmission/reception region
R2: Non-transmission/reception region
Rs: Seal region
1000L: Liquid crystal lens
101L: Flat substrate
1L: First transparent substrate
15L: Transparent electrode
M1L: Alignment film
LC2: Liquid crystal layer
201L: Lens-shaped substrate
51L: Second transparent substrate
31L: Fresnel lens structure
55L: Transparent electrode
M2L: Alignment film
lc2: Liquid crystal molecule (Liquid crystal compound)

The invention claimed is:

1. A scanning antenna comprising:
a liquid crystal alignment agent comprising:
  an alignment film forming material; and
  an organic solvent
  wherein the organic solvent contains a compound which has at least two functional groups selected from the group consisting of a methylene group, a methyl group, an ether group, a ketone group, and a hydroxyl group, and does not contain a nitrogen atom a liquid crystal panel, comprising:
  a liquid crystal layer; and
  a pair of first and second substrates disposed with the liquid crystal layer interposed therebetween and including an alignment film formed on a surface of each of the first and second substrates facing the liquid crystal layer, or a surface of any one of the first and second substrates facing the liquid crystal layer, by using the liquid crystal alignment agent a plurality of antenna units arranged in the scanning antenna, wherein
    the first substrate of the liquid crystal panel includes:
      a thin film transistor (TFT) substrate including a first dielectric substrate, a plurality of TFTs supported by the first dielectric substrate, a plurality of patch electrodes electrically connected to the TFTs; and
      a first alignment film disposed to cover the TFTs and the patch electrodes and including the alignment film,
    the second substrate of the liquid crystal panel includes a slot substrate including a second dielectric substrate, a slot electrode supported by the second dielectric substrate and including a plurality of slots, and a second alignment film disposed to cover the slot electrode and including the alignment film, and
    the liquid crystal layer of the liquid crystal panel is interposed between the TFT substrate and the slot substrate of which the first alignment film and the second alignment film face each other,
  the scanning antenna further comprising a reflective conductive plate disposed to face an opposite surface of the second dielectric substrate on which the slot electrode is not formed with a dielectric layer interposed therebetween.

2. The liquid crystal alignment agent according to claim 1, wherein the organic solvent contains at least one selected from the group consisting of γ-butyrolactone, diethylene glycol diethyl ether, diethylene glycol ethyl methyl ether, diisobutyl ketone, butyl cellosolve, 1-butoxy-2-propanol, and cyclopentanone.

3. The liquid crystal alignment agent according to claim 1, wherein the organic solvent contains γ-butyrolactone and/or cyclopentanone as a main agent.

4. The liquid crystal alignment agent according to claim 1, wherein the organic solvent contains at least one selected from the group consisting of 1-butoxy-2-propanol, butyl cellosolve, diethylene glycol diethyl ether, diethylene glycol ethyl methyl ether, and diisobutyl ketone, in addition to γ-butyrolactone.

5. The liquid crystal alignment agent according to claim 1, wherein the organic solvent contains diisobutyl ketone, in addition to γ-butyrolactone.

6. The liquid crystal alignment agent according to claim 1, wherein the alignment film forming material is a material forming an alignment film which aligns a liquid crystal compound having dielectric anisotropy (Δε) of 10 or more.

7. The liquid crystal alignment agent according to claim 1, wherein the alignment film forming material contains an acrylic polymer.

8. The liquid crystal alignment agent according to claim 1, wherein the alignment film forming material contains a polyamic acid.

9. The liquid crystal panel according to claim 1, wherein the liquid crystal layer is constituted by a liquid crystal compound having dielectric anisotropy (Δε) of 10 or more.

* * * * *